US012804598B2

(12) United States Patent
Gomez Martinez

(10) Patent No.: US 12,804,598 B2
(45) Date of Patent: Nov. 17, 2026

(54) LOCATION BASED ON TIME OF FLIGHT USING UNCALIBRATED RADIO AND ANTENNA

(71) Applicant: QUALCOMM Incorporated, San Diego, CA (US)

(72) Inventor: Feliciano Gomez Martinez, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 18/812,495

(22) Filed: Aug. 22, 2024

(65) Prior Publication Data

US 2026/0059490 A1 Feb. 26, 2026

(51) Int. Cl.
*H04W 64/00* (2009.01)
*H04L 5/00* (2006.01)

(52) U.S. Cl.
CPC ......... *H04W 64/006* (2013.01); *H04L 5/0051* (2013.01)

(58) Field of Classification Search
CPC . H04L 27/2601; H04L 5/0053; H04L 5/0094; H04L 5/00; H04L 1/00; H04W 28/0268; H04W 28/10; H04W 76/10; H04W 80/02; H04W 76/12; H04W 28/02; H04W 80/10; H04W 76/20; H04W 52/0235; H04W 74/0833; H04W 76/27; H04W 76/28; H04W 72/21; H04W 72/23; H04W 4/70; H04W 52/02; H04W 72/04; H04W 74/04; H04W 74/08; H04W 76/00; H04W 72/12; Y02D 30/70
USPC .......................................................... 455/456
See application file for complete search history.

(56) References Cited

U.S. PATENT DOCUMENTS

| | | | | |
|---|---|---|---|---|
| 11,037,320 | B1 * | 6/2021 | Ebrahimi Afrouzi .. | G01C 3/085 |
| 11,069,082 | B1 * | 7/2021 | Ebrahimi Afrouzi ... | G01S 17/48 |
| 2022/0168899 | A1 * | 6/2022 | Boroushaki ........ | G06K 19/0723 |
| 2022/0327360 | A1 * | 10/2022 | Merlin .................... | G01S 7/417 |
| 2022/0329330 | A1 * | 10/2022 | Merlin ................. | H04B 17/318 |
| 2022/0329973 | A1 * | 10/2022 | Karmanov ............ | G01S 5/0278 |

(Continued)

FOREIGN PATENT DOCUMENTS

| | | | | |
|---|---|---|---|---|
| WO | WO-2022144654 A1 * | 7/2022 | ............. | G06T 7/277 |
| WO | WO-2024118779 A1 * | 6/2024 | ........ | B60W 50/0097 |

(Continued)

*Primary Examiner* — Nathan S Taylor
(74) *Attorney, Agent, or Firm* — Procopio, Cory, Hargreaves & Savitch LLP

(57) ABSTRACT

Aspects presented herein may enable a tracking device to estimate the distance of a target device without calibrated radios/antenna(s) at the tracking/target device. In one aspect, a first UE measures a set of time-of-flights (ToFs) between the first UE and a second UE at multiple locations of the first UE. The first UE tracks positions and orientations of the first UE during the measurement of the set of ToFs at the multiple locations of the first UE. The first UE computes a loss function based on the differences between the set of ToFs and the tracked positions and orientations of the first UE, where the loss function is associated with a probability in which the second UE is at a specified location. The first UE estimates at least one of a direction or a distance of the second UE from the first UE based on the computed loss function.

20 Claims, 16 Drawing Sheets

(56) References Cited

U.S. PATENT DOCUMENTS

| | | | | |
|---|---|---|---|---|
| 2023/0273291 | A1* | 8/2023 | Ozturk | G01S 7/006<br>342/52 |
| 2024/0280372 | A1* | 8/2024 | Abbott | G01S 17/89 |
| 2024/0281988 | A1* | 8/2024 | Abbott | G01S 17/89 |
| 2025/0089016 | A1* | 3/2025 | Belzberg | H04W 64/006 |
| 2025/0370086 | A1* | 12/2025 | Gomez Martinez | G01S 3/023 |
| 2025/0378652 | A1* | 12/2025 | Kaifosh | A61B 5/397 |
| 2025/0384694 | A1* | 12/2025 | Sakthi | G06V 20/56 |
| 2026/0003027 | A1* | 1/2026 | Gomez Martinez | G01S 3/48 |
| 2026/0049815 | A1* | 2/2026 | Teng | G01C 9/00 |

FOREIGN PATENT DOCUMENTS

| | | | | |
|---|---|---|---|---|
| WO | WO-2024220216 | A1 * | 10/2024 | G01C 21/32 |
| WO | WO-2025006288 | A1 * | 1/2025 | B60W 60/0015 |

* cited by examiner

LOCATION BASED ON TIME OF FLIGHT USING UNCALIBRATED RADIO AND ANTENNA

TECHNICAL FIELD

The present disclosure relates generally to communication systems, and more particularly, to wireless communication involving tracking.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some telecommunication standards also provide positioning and tracking/ranging protocols and techniques that enable mobile network operators to provide high-accuracy location/tracking/ranging services to their subscribers. For example, 5G NR include various standards for network-based positioning that use signals and features of the 5G network to perform or improve the positioning of a device. There also exists a need for further improvements in these positioning protocols and techniques.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus measures, a set of time-of-flights (ToFs) between the first UE and a second UE at multiple locations of the first UE. The apparatus tracks positions and orientations of the first UE during the measurement of the set of ToFs at the multiple locations of the first UE. The apparatus computes a loss function based on the set of ToFs and the tracked positions and orientations of the first UE, where the loss function is associated with a probability in which the second UE is at a specified location. The apparatus estimates at least one of a direction or a distance of the second UE from the first UE based on the computed loss function.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
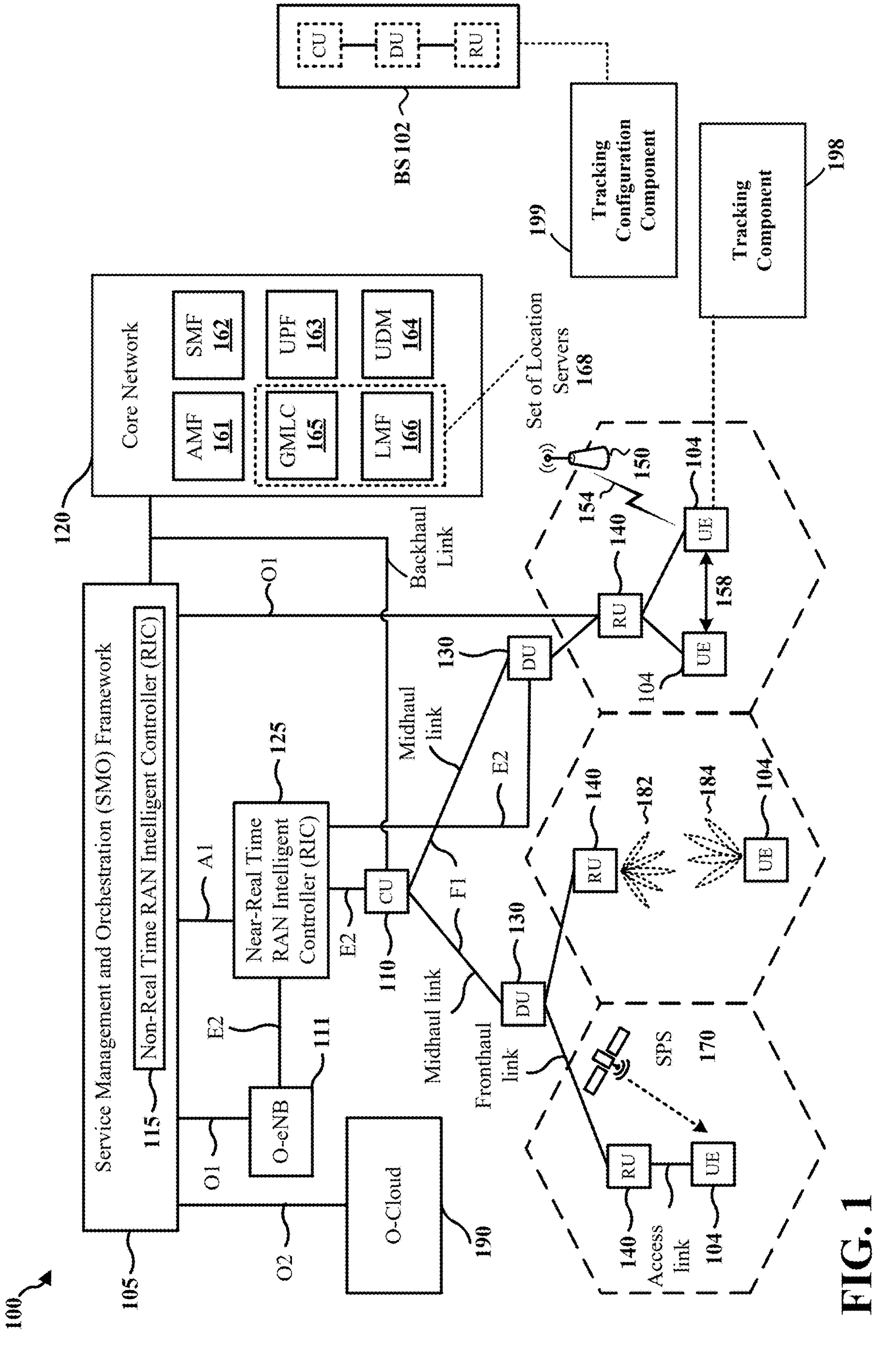
FIG. 1 is a diagram illustrating an example of a wireless communications system and an access network.

Various aspects relate generally to wireless communication and more particularly to tracking and/or ranging based on wireless communication. Some aspects more specifically relate to improving the overall performance of wireless tracking and ranging by enabling a tracking device to accurately estimate the distance of a target device based on ToF, where at least one of the tracking device or the target device may use uncalibrated radios/antenna(s) (or without radio/antenna calibration). Then, the tracking device may also determine the position of the target device after multiple distances at different locations are available/measured, such as based on using a triangulation technique (e.g., some form of virtual triangulation). For example, in one aspect of the present disclosure, a wireless device may be configured to rely on difference in ToF between multiple wireless device positions, instead of the actual ToF value, removing the specification for accurate radio/antenna calibration. Aspects presented herein may bring significant benefits, such as enabling a wireless device to perform high accuracy tracking without specifying the manufacturer of the wireless device to incur cost and time to calibrate the wireless device. In addition, aspects presented herein also enable location/ranging capabilities to be extended to low-end devices for which it may not be economically feasible to spend significant amount of factory test time performing antenna and RF chain calibration.

Particular aspects of the subject matter described in this disclosure can be implemented to realize one or more of the following potential advantages. Aspects presented herein may bring significant benefits, such as reducing/eliminating the factory calibration time for each device, and making it feasible to use ranging technology in low-cost wireless devices. For example, a typical tracking solution may specify a tracking device to rely on having an accurate calibration of their RF chains in order to get accurate RTT estimates, where such calibration may be specified to be performed for each combination of: radio type (e.g., UWB, Wi-Fi, BT), frequency band (e.g., 2.4 GHz, 5 GHz, 6 GHZ), channel, filter setting, gain setting, and/or antenna, etc. Thus, the calibration time could take several minutes per tracking device, which may make it impractical or uneconomical except for certain high-end tracking devices (e.g., premium phones), and may just for a subset of radios (e.g., just for UWB). As aspects presented herein do not specify an accurate calibration, it may enable "lost item" finding use cases in wireless devices with uncalibrated antennas, radios, element(s) in an RF chain (e.g., value-tier phones).

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements.

For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-cNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an AI interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as AI policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a “sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHZ), FR4 (71 GHz-114.25 GHZ), and FR5 (114.25 GHz-300 GHz). Each of these higher frequency bands falls within the EHF band.

With the above aspects in mind, unless specifically stated otherwise, the term “sub-6 GHz” or the like if used herein may broadly represent frequencies that may be less than 6 GHZ, may be within FR1, or may include mid-band frequencies. Further, unless specifically stated otherwise, the term “millimeter wave” or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, cNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a tracking component 198 that may be configured to measure a set of time-of-flights (ToFs) between the first UE and a second UE at multiple locations of the first UE; track positions and orientations of the first UE during the measurement of the set of ToFs at the multiple locations of the first UE; compute a loss function based on the set of ToFs and the tracked positions and orientations of the first UE, where the loss function is associated with a probability in which the second UE is at a specified location; and estimate at least one of a direction or a distance of the second UE from the first UE based on the computed loss function. In certain aspects, the base station 102 may have a tracking configuration component 199 that may be configured to provide configurations and/or parameters related to tracking/ranging for the UE 104.

Figures 2A, 2B, 2C, 2D:
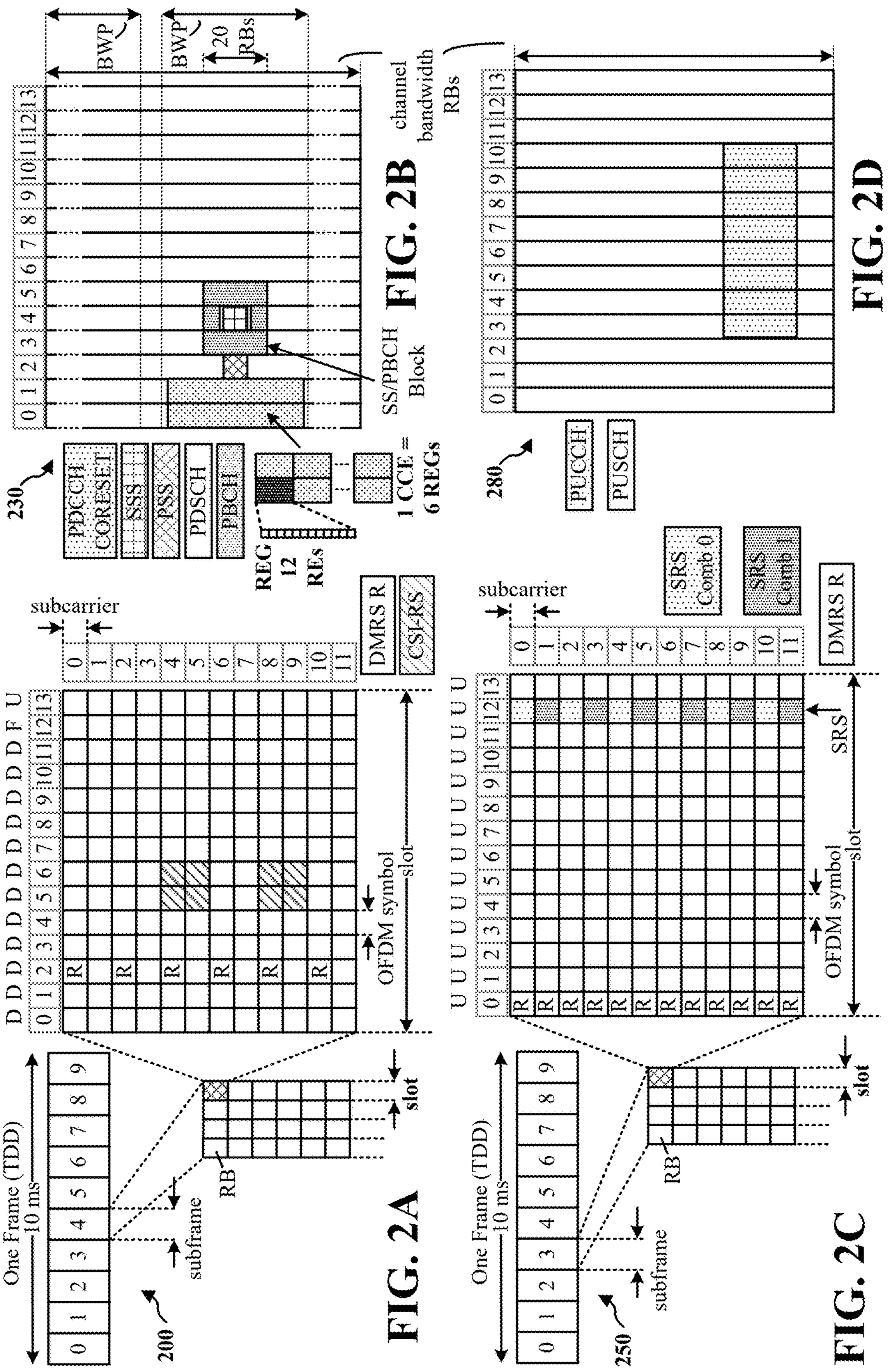
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology u=4 has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
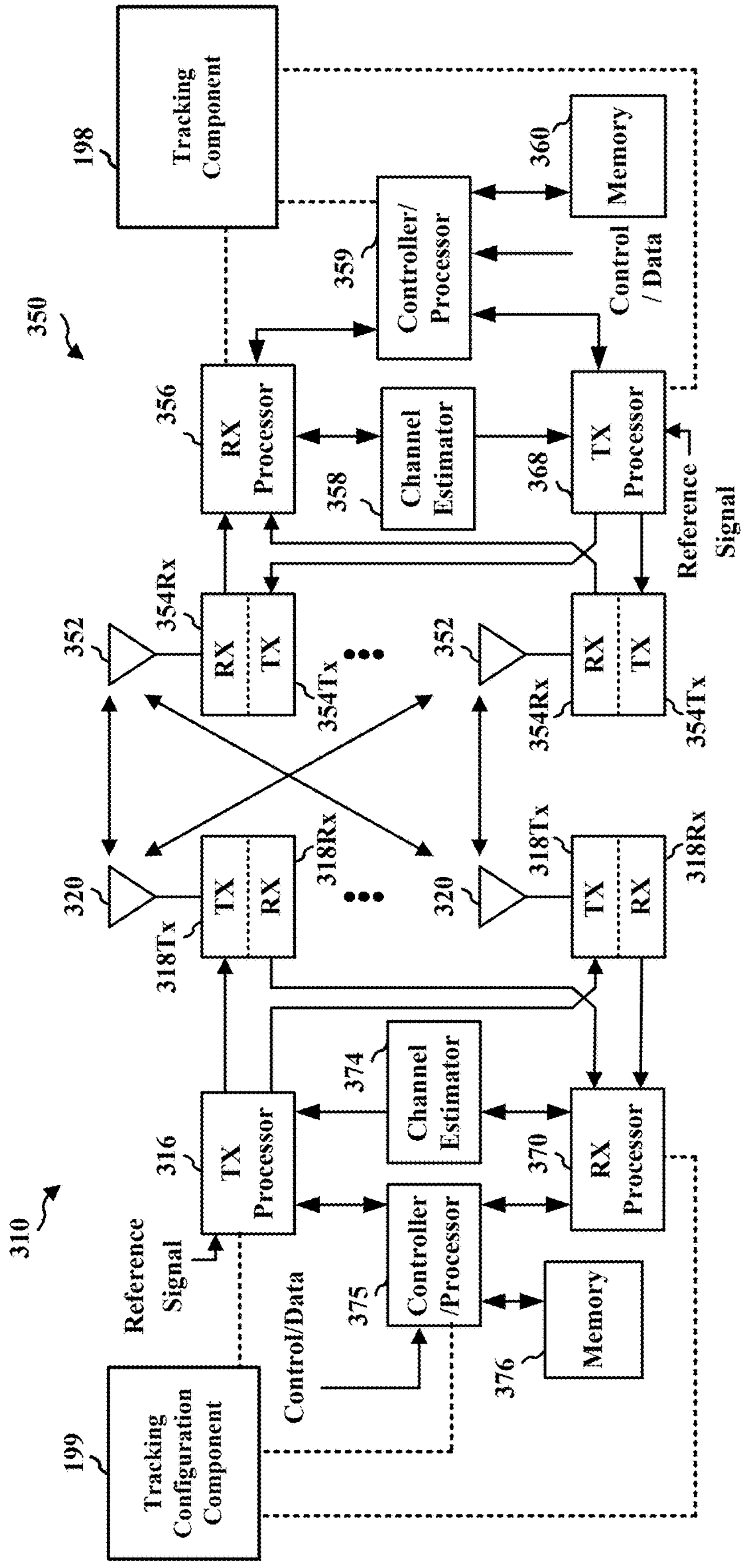
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the tracking component 198 of FIG. 1.

At least one of the TX processor 316, the RX processor 370, and the controller/processor 375 may be configured to perform aspects in connection with the tracking configuration component 199 of FIG. 1.

Figure 4:
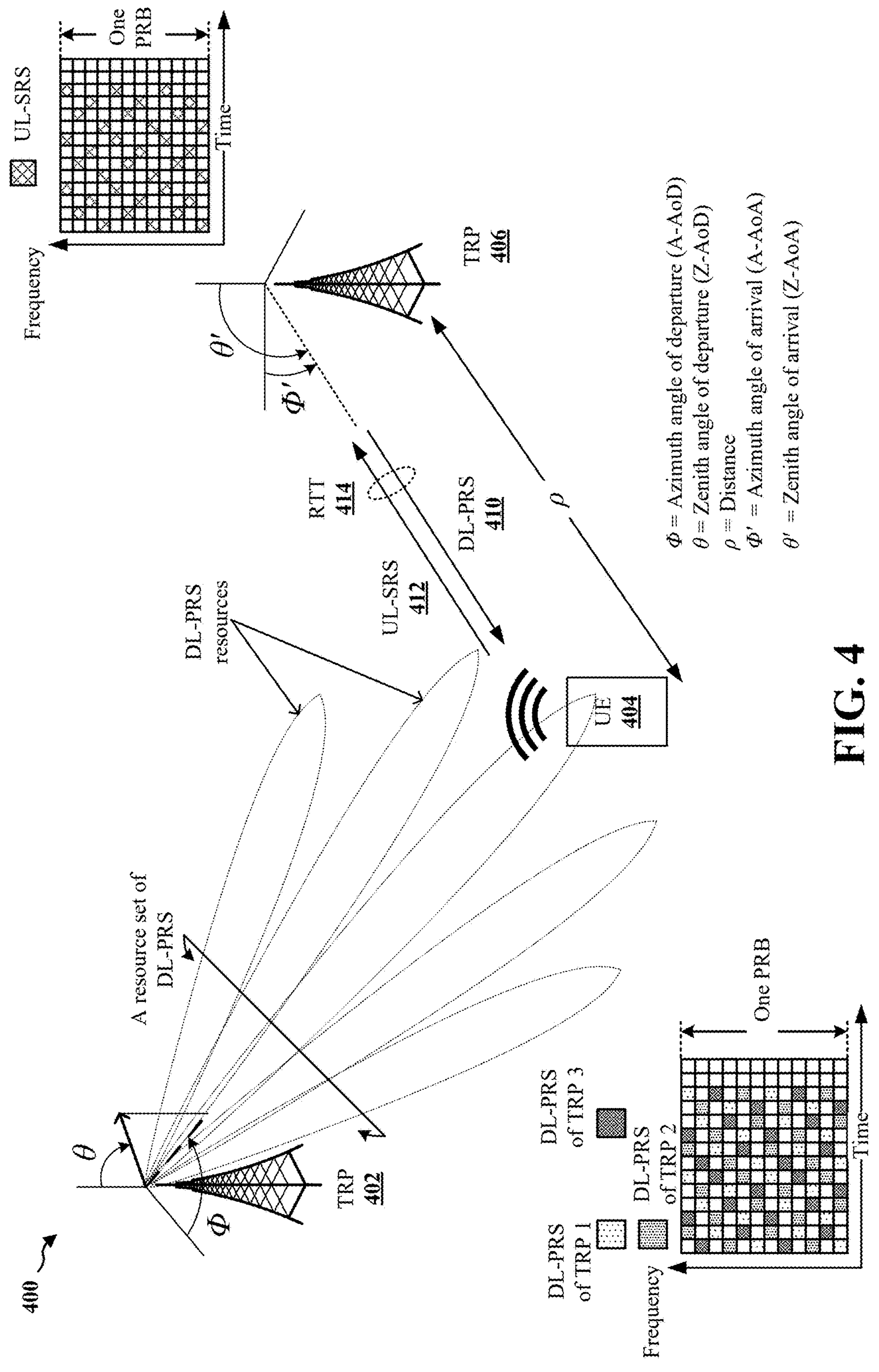
FIG. 4 is a diagram illustrating an example of a UE positioning based on reference signal measurements in accordance with various aspects of the present disclosure.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $||T_{SRS\_RX}-T_{PRS\_TX}|-|T_{SRS\_TX}-T_{PRS\_RX}||$. Accordingly, multi-RTT positioning may make use of the UE Rx-Tx time difference measurements (i.e., $|T_{SRS\_TX}-T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS." In addition, the term "location" and "position" may be used interchangeably throughout the specification, which may refer to a particular geographical or a relative place.

In addition to the network-based positioning described in connection with FIG. 4, various positioning methods/mechanisms have also been developed for localizing or tracking the position of a target. These positioning methods/mechanisms may be classified into active positioning (which may also be referred to and used interchangeably with "active localization") and passive positioning (which may also be referred to and used interchangeably with "passive localization"). For active positioning, a wireless device may locate a target based on signals transmitted from the target. For example, the target may be attached or configured with a radio frequency (RF)-capable device/component, such as a tag (e.g., an RF tag), a Global Positioning System (GPS)/wireless tracker, a device/component capable of transmitting/receiving positioning reference signals, a device/component capable of performing or responding to ranging/radar operations, etc. Then, based on signals transmitted from the target (or from the RF-capable device/component attached to the target), the wireless device may calculate or estimate the location of the target. On the other hand, for passive positioning, a target may be localized and tracked without attaching an RF-capable device/component to the target. For example, RF radars, Lidars, sonars, and/or cameras are example technologies/components that may be used by a wireless device for passive positioning, where the wireless device may locate a target based on images or based on reflection of signals.

A wireless device may be able to locate and track another wireless device based on using one or more tracking technologies. For purposes of the present disclosure, tracking technologies may refer to methods and systems that are used for estimating, monitoring, and/or following the movements/locations of a target (e.g., an object, a person, an animal, a vehicle, etc.) over time. Tracking technologies may have different applications across various industries, and may use different principles and devices to achieve the tracking. Depending on implementations, some tracking technologies may be based on ranging operations, which may be referred to as ranging technologies. A ranging operation/technology may refer to a method/technique that is used to measure the distance between two points or objects. An example of ranging operation/technology may include a user locating a target device (e.g., a Bluetooth® device such as a pair of earbuds) using a mobile device (e.g., a smartphone), where the mobile device may continue to estimate the distance and/or location of the target device based on signals from the target device. Depending on the context, in some examples, the term "track/tracking" may be used interchangeably with the term "position/positioning" or "location/locationing." For example, a wireless device may be configured to track a target based on estimating the position/location of the target using Wi-Fi technologies, which may be referred to as Wi-Fi tracking or Wi-Fi positioning/locationing. Similarly, depending on the context, in some examples, the term "tracking" may be used interchangeably with the term "ranging." For example, a wireless device may be configured to track a target based on performing ranging against the target using UWB technologies, which may be referred to as UWB/UWB-based tracking or ranging.

The tracking technologies may be used in various fields such as surveying, navigation, robotics, telecommunications, etc. Examples of tracking technologies may include:

(1) global navigation satellite system (GNSS)/global positioning system (GPS) tracking-GNSS/GPS tracking relies on a network of satellites to provide real-time location information. GNSS/GPS receivers, often embedded in devices like smartphones, vehicles, or wearables, may determine their precise location and movement.

(2) radio-frequency identification (RFID) tracking-RFID technology uses radio waves to identify and track objects equipped with RFID tags, where these RFID tags may include electronic information that can be read by RFID readers, enabling the tracking of items in logistics, inventory management, and access control.

(3) Bluetooth® (BT) tracking-Bluetooth technology may be used for tracking by measuring the signal strength between devices. Bluetooth channel sounding (CS) (BTCS) is another technique that may also be used for tracking by measuring the round-trip-time (RTT)/the phase delay of RF signals between devices. Bluetooth beacons or tags may be attached to objects or carried by individuals, and their proximity to Bluetooth receivers may be used to estimate their location.

(4) Wi-Fi® tracking-Wi-Fi tracking may involve using signals from Wi-Fi access points (APs) to estimate the location of target devices. This tracking method is often suitable for indoor environments, such as malls and airports, for tracking people or assets.

(5) cellular tracking-mobile network infrastructure may be able to track devices through the triangulation of cell tower signals. The approximate location of a mobile device can be determined by analyzing the signals it receives from nearby cell towers.

(6) inertial navigation systems—these systems may use accelerometers and gyroscopes to track changes in velocity and orientation.

(7) computer vision tracking-advanced computer vision technologies, including object recognition and tracking algorithms, may enable cameras and sensors to track the movement of objects or people based on visual data.

(8) ultra-wideband (UWB) tracking-UWB tracking may utilize signals with very high frequency ranges or bandwidths. UWB technology transmits data using a broad spectrum of frequencies, enabling precise and accurate tracking of objects or individuals in both indoor and outdoor environments. UWB tracking systems typically operate in the frequency range of 3.1 to 10.6 gigahertz.

As discussed above, ranging operations/technologies may refer to methods/techniques that is used to measure the distance between two points or objects. Examples of ranging operations/technologies may include:

(1) triangulation—triangulation involves measuring the angles between an observer and two known points or landmarks. By using trigonometry, the distance to the object may be calculated or estimated.

(2) time of flight (ToF)—ToF technology measures the time taken for a signal (such as light or sound) to travel from a transmitter to a target and back to a receiver. By knowing the speed of the signal, usually the speed of light or sound, the distance may be calculated or estimated.

(3) GNSS—GNSS systems, such as GPS, global navigation satellite system (GLONASS), Galileo, and BeiDou, use signals from satellites to determine the position of a receiver on Earth. By analyzing the amount of time it takes for signals from multiple satellites to reach the receiver, its position (including distance) may be calculated or estimated.

(4) RFID—RFID technology uses electromagnetic fields to automatically identify and track tags attached to objects. The distance between the reader and the RFID tag may be estimated based on the strength of the received signal.

(5) ultrasonic ranging—ultrasonic ranging involves emitting ultrasonic pulses and measuring the time it takes for the pulses to bounce back from the object. The speed of sound in the medium determines the distance.

(6) laser ranging (e.g., light detection and ranging (Lidar))—laser ranging uses lasers to measure the distance to a target by calculating the time it takes for laser pulses to travel to the target and back.

Among the aforementioned tracking/ranging technologies, UWB, Bluetooth, and/or Wi-Fi based tracking/ranging have continued to be widely used and developed for most wireless devices (e.g., consumer devices such as mobile phones, smart watches, etc.) due to their accessibility and tracking/ranging precisions.

UWB tracking/ranging may refer to using a UWB device/technology to locate and track objects, people, or assets within a certain range. A UWB device (e.g., a device that is capable of performing UWB tracking/ranging) may use pulse-based radio signaling (e.g., Short-pulse-UWB) instead of orthogonal frequency division multiplexing (OFDM)-based signaling (e.g., Multi-Band (MB)-OFDM-UWB (MB-OFDM-UWB)). Short-pulse-UWB signaling may transmit with the energy for each bit spread over the entire UWB channel bandwidth (e.g., 1.37 GHz, 4 GHZ, etc.) with varying pulse amplitude and/or pulse polarity without using a RF carrier while MB-OFDM-UWB may transmit each bit using a 4 MHz bandwidth channel.

Using short-pulse-UWB signaling systems may provide several advantages over MB-OFDM-UWB signaling systems and other OFDM-based systems. For example, a short-pulse-UWB signaling system may provide better fading characteristics (e.g., Gaussian-modeled fading versus Rayleigh-modeled fading, and/or less than 1% of channels experiencing 2 dB or more fading) than an MB-OFDM-UWB signaling system. As other examples, a short-pulse-UWB signaling system may operate accurately without employing FEC (Forward Error Correction), using no-rake processing, with lower peak-to-average RF, and/or with longer battery life than an MB-OFDM-UWB signaling system. Short-pulse-UWB also does not use traditional modulation and demodulation techniques such as Fast Fourier Transforms (FFT), but may use time-domain or space-time processing techniques. Short-pulse-UWB may utilize various shapes (e.g., Gaussian pulses, Monocycle pulses, Hermite pulses, etc.) and the shape used may be chosen based on their properties in time and frequency domains among other factors, such as Bandwidth utilization, Interference Mitigation, Power Spectral Density, Multipath fading and inter-symbol interference, design complexity, power consumption, range, tradeoffs for ultra-fast sampling, etc. Short-pulse-UWB, in some cases, may benefit from a high speed Analog-to-Digital converter (ADC) and a high speed Digital-to-Analog Converter (DAC) to be able to handle the very wide frequency band used; however, there may be other ways to handle the need for ultra-fast sampling such as using Time Hopping techniques, Direct Sequence coding techniques, etc.

MB-OFDM-UWB may divide up spectrum into several frequency sub-bands and OFDM is applied within each band; whereas, other OFDM systems may typically operate within a fixed frequency band. The complex waveform created by combining the multiple-sub-bands results in a final waveform that used for transmission for MB-OFDM-UWB. MB-OFDM-UWB also varies from other OFDM systems by not using a guard interval, using simpler modulation schemes like Binary Phase Shift keying (BPSK) or Quadrature phase-shift keying (QPSK) vs. 64 or 256 Quadrature Modulation (QAM), utilizes a constant power level whereas other OFDM systems may utilize power control for varying channel conditions, etc.

Bluetooth tracking/ranging may refer to using Bluetooth device/technology to locate and track objects, people, or assets within a certain range. This technology may rely on Bluetooth-enabled devices, such as smartphones, tablets, or specialized Bluetooth tags, to communicate with each other and determine their relative positions.

Bluetooth tracking may include beacon-based tracking and Bluetooth low energy (LE) tracking. Beacon-based tracking may involve deploying Bluetooth beacons that emit Bluetooth signals at regular intervals. These signals are picked up by Bluetooth-enabled devices in the vicinity, such as smartphones or tablets. By measuring the signal strength and timing of these beacon signals, the receiving devices can estimate their proximity to the beacon. This information may then be used to determine the location of the Bluetooth-enabled device within the range of the beacon. Bluetooth LE tracking may enable devices to communicate over short distances while consuming minimal power. Bluetooth LE tracking systems may include attaching tags to objects or carried by individuals, and Bluetooth LE receivers (such as smartphones or dedicated receivers) that scan for these tags. The receivers detect the signals transmitted by the tags and use signal strength and other parameters to estimate the distance between the tag and the receiver. By triangulating signals from multiple receivers, the system can determine the location of the tagged object or person. Bluetooth channel sounding (CS) is a technique used in Bluetooth communication to measure time/phase delay of BT signals, such that distance between wireless devices may be estimated/measured more accurately.

Wi-Fi tracking/ranging may refer to using a Wi-Fi capable device/technology for monitoring and tracking the movement of devices within a Wi-Fi network's coverage area. Wi-Fi tracking may rely on the unique media access control (MAC) addresses of Wi-Fi-enabled devices, such as smartphones, tablets, and laptops, to identify and track them as they move within the network's range. For example, Wi-Fi tracking utilizes Wi-Fi access points (APs), which are devices that provide wireless network connectivity to devices within their range. These access points continuously broadcast Wi-Fi signals, allowing Wi-Fi-enabled devices to connect to the network. When Wi-Fi-enabled devices come within range of Wi-Fi access points, they may be configured to automatically send out probe requests, seeking available networks to connect to. Wi-Fi access points receive these probe requests and respond with probe responses containing information about the network, such as the service set identifier (SSID) and signal strength. Each Wi-Fi-enabled device may have a unique MAC address associated with its network interface. Wi-Fi tracking systems capture these MAC addresses from the probe requests and responses exchanged between devices and access points. By monitoring the signal strength and timestamps of probe requests and responses from multiple access points, Wi-Fi tracking systems may triangulate the position of Wi-Fi-enabled devices within the network's coverage area.

Figure 5:
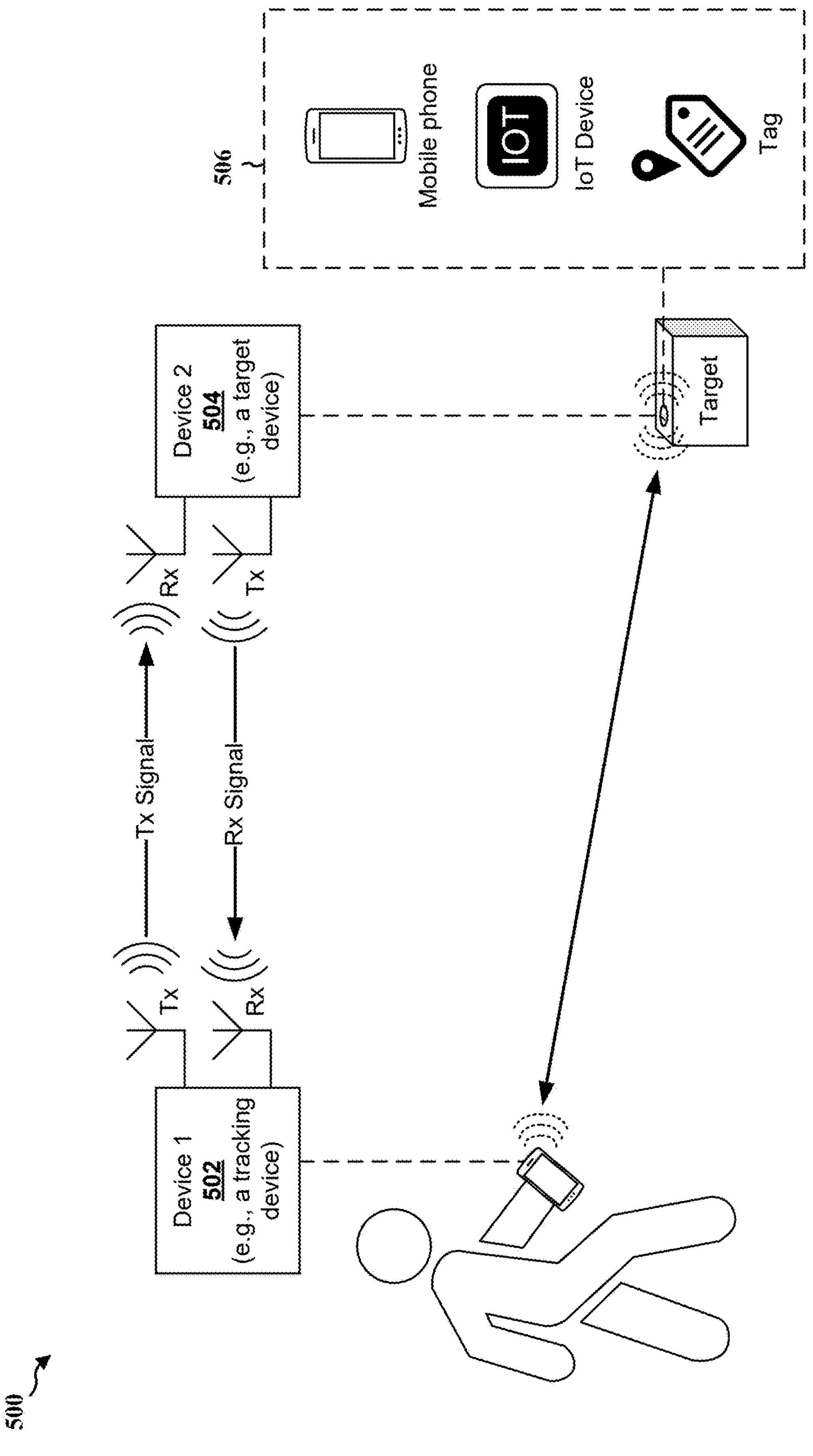
FIG. 5 is a diagram illustrating an example of tracking in accordance with various aspects of the present disclosure.

FIG. 5 is a diagram 500 illustrating an example of tracking (e.g., active positioning) in accordance with various aspects of the present disclosure. A first device 502 (which may also be referred to as a "tracking device" or a "finder device" for purposes of the present disclosure) may be able to locate a second device 504 (which may also be referred to as a "target" or a "target device" for purposes of the present disclosure) based on transmitting signals (which may be referred to as "transmission (Tx) signals") to the second device 504, and receive signals (which may be referred to as "reception (Rx) signals") from the second device 504. Depending on implementations, the Rx signals may be signals reflected from the second device 504 (e.g., based on the Tx signals) or signals generated by the second device 504. Then, based on the time-of-flight (ToF) of the Tx signals and the Rx signals, the first device 502 may estimate the distance of the second device 504 from the first device 502. In some configurations, if the first device is also capable of measuring the angle-of-arrival (AoA) of the Rx signals, the first device 502 may also be able to estimate the direction of the second device 504 from the first device 502 (which may be referred to as the relative direction from the first device 502). As shown at 506, the second device 504 may be a mobile phone, an Internet of Things (IoT) device, or a tag (e.g., a BT or UWB tag), and the localizing and/or tracking of the second device 504 may be based on using Bluetooth® tracking, Wi-Fi tracking, or UWB tracking, etc.

The tracking mechanisms discussed above may have a variety of applications in real life. For example, it is common for users to lose small items (e.g., earbuds, keys, wallets, etc.) somewhere in their home, at work, or in school, and users may often rely on using tracking devices (e.g., their mobile phones) to find those lost items (e.g., earbuds, smart tags, other phones) near them. In some scenarios, a tracking device may just have the capability to identify a rough location of a target device. For example, some tracking devices may be able to just estimate that an item (e.g., a target device) is at a rough location (e.g., at home, at a specific address, at a business, etc.) based on detecting the strength of wireless signals from the item. However, in some scenarios, it may not be enough for users to know that the item is at a rough location, and the users may want to know the specific location of the item, such as in a specific room (e.g., in a restroom, bedroom, kitchen, etc.) or in a specific location (e.g., under the bed, on a coach, etc.). As such, accurate positioning/tracking of the target device can be very useful for users. However, such precise positioning/tracking is often not enabled in user mobile devices as it may specify a careful calibration of the antennas and other radio frequency (RF) components (e.g., filters, amplifiers, etc.) in order to measure signal delay (e.g., for finding the distance between a tracking device and a target device), and most mobile device manufacturers may not want to incur the cost of calibration as it may increase the overall cost of their mobile devices.

Figure 6:
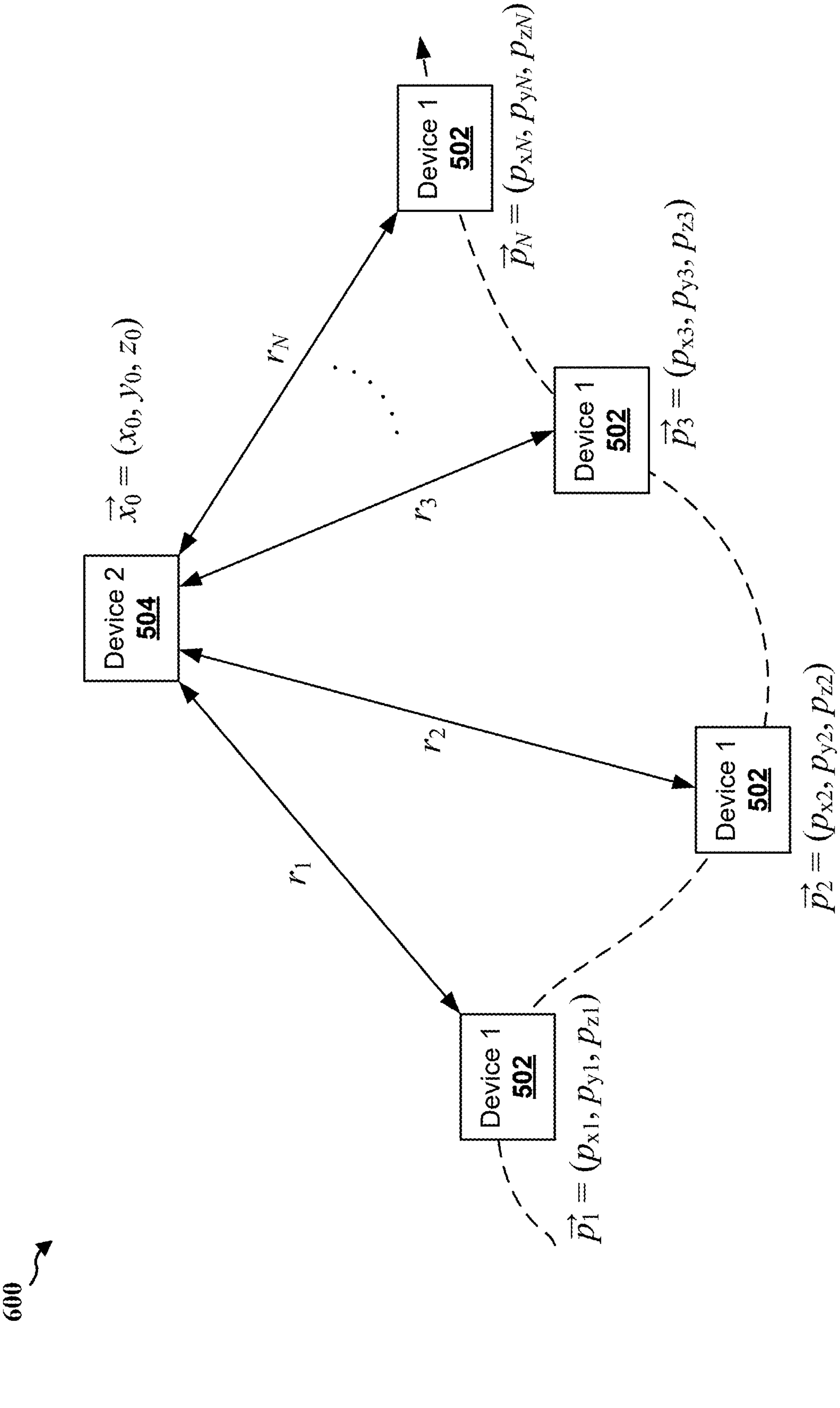
FIG. 6 is a diagram illustrating an example of a tracking device moving through space while measuring time of flight (ToF) distance to a target device in accordance with various aspects of the present disclosure.

FIG. 6 is a diagram 600 illustrating an example of a tracking device moving through space while measuring time of flight (ToF) distance to a target device in accordance with various aspects of the present disclosure. In one example, a tracking device (e.g., the first device 502, a mobile phone, etc.) may be configured to perform multiple distance measurements $r_i$ for a target device (e.g., the second device 504) from multiple positions $\vec{p}_i$ of the tracking based on ToF. For example, when the first device 502 (e.g., the tracking device) is at a first position $\vec{p}_1$, the first device 502 may measure a first distance r between the first device 502 and the second device 504 (e.g., the target device) based on ToF, such as described in connection with FIG. 5. Similarly, when the first device 502 is at a second position $\vec{p}_2$, the first device 502 may measure a second distance $r_2$ between the first device 502 and the second device 504 based on ToF, and so on. Then, based on multiple distance measurements (e.g., $r_1$ to $r_n$) at multiple positionings (e.g., $\vec{p}_1$ to $\vec{p}_n$), the first device 502 may determine the position of the second device 504, such as based on triangulation.

Figure 7A:
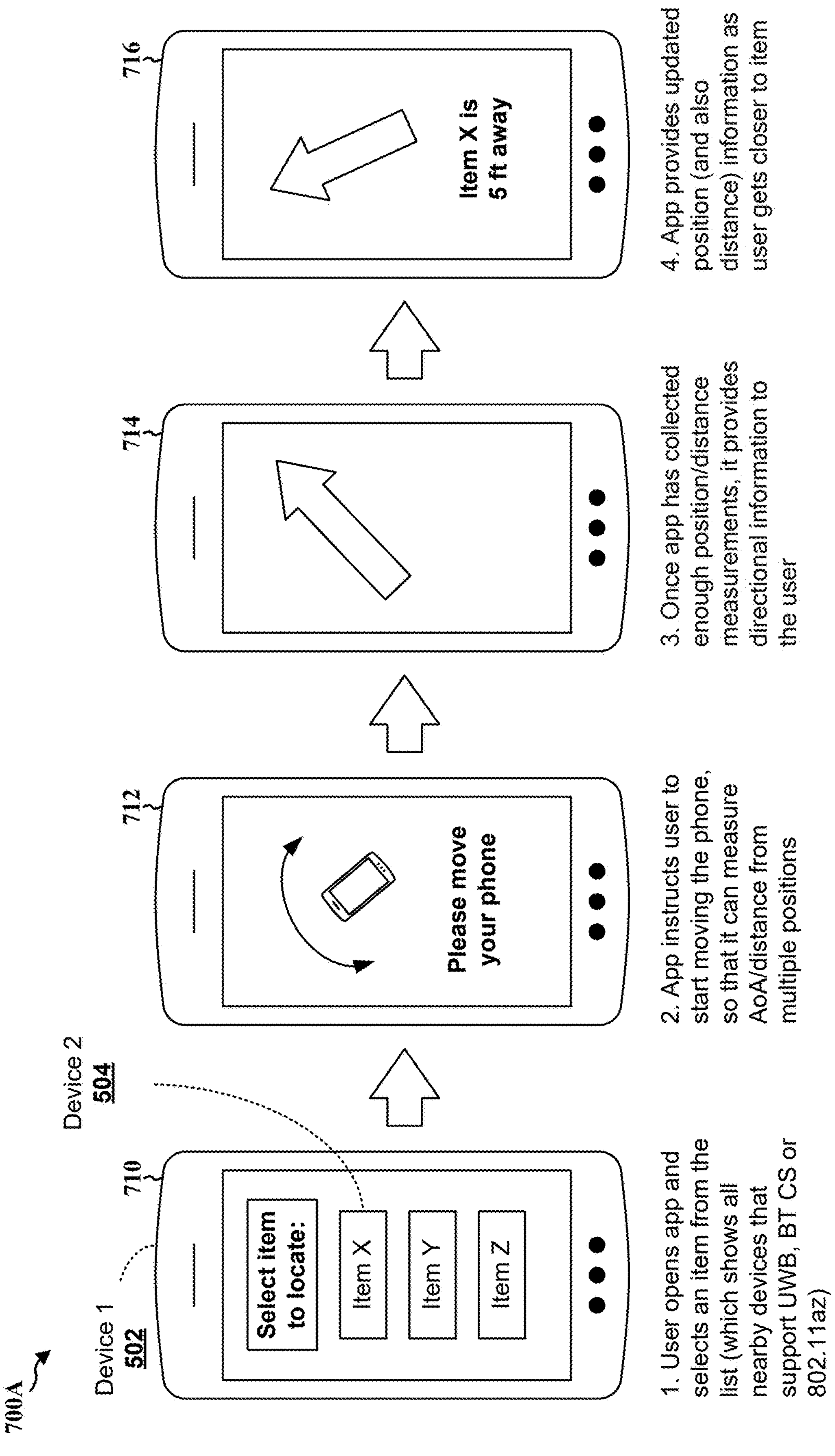
FIG. 7A is a diagram illustrating an example user experience of a tracking device locating a target device in accordance with various aspects of the present disclosure.

FIG. 7A is a diagram 700A illustrating an example user experience of a tracking device locating a target device in accordance with various aspects of the present disclosure. In some examples, after the tracking device determines the position of the target device, the tracking device may further be configured to display distance information of the target device to the user to guide the user in the process of finding the target device (e.g., the distance information obtained from FIG. 6 may be fed into an algorithm or an application). For example, as shown at 710, the first device 502 (e.g., the tracking device) or an application running on the first device 502 may instruct the user (e.g., via a user interface (UI)) to select an item (e.g., from a list of detected items) for tracking/locating. As shown at 712, after the user selects an item (e.g., item X) that is associated with the second device 504 (e.g., the target device, such as an RFID tag, a pair of Bluetooth earbuds, etc.), the first device 502 may instruct the user to move the first device 502, such that the first device 502 may be able to measure the distance and/or the angle-of-arrival (AoA) between the first device 502 and the second device 504 from multiple positions. As shown at 714, after the first device 502 has collected sufficient AoA/distance measurements, the first device 502 may start providing directional information of the second device 504 to the user, such as by showing the direction of the second device 504 with respect to the first device 502. Then, as shown at 716, the first device 502 may continue to update the directional information (and may also start to provide distance information) of the second device 504 as the user moves, and may stop the update after the user locates the second device 504 (e.g., after the first device 502 is within a threshold distance of the second device 504).

However, wireless location technologies (e.g., UWB, Wi-Fi RTT, BTCS) discussed above may rely on careful calibration of their RF chains (e.g., antennas, filters, amplifiers, etc.) in order to obtain/perform accurate ToF measurements, and the calibration may take time and incur additional cost to manufacturers. Without antenna calibration, a tracking device may not be able to (accurately) measure the ToF of a target device, and the precise location capability described in connection with FIG. 6 may not be available for the tracking device.

Figure 8:
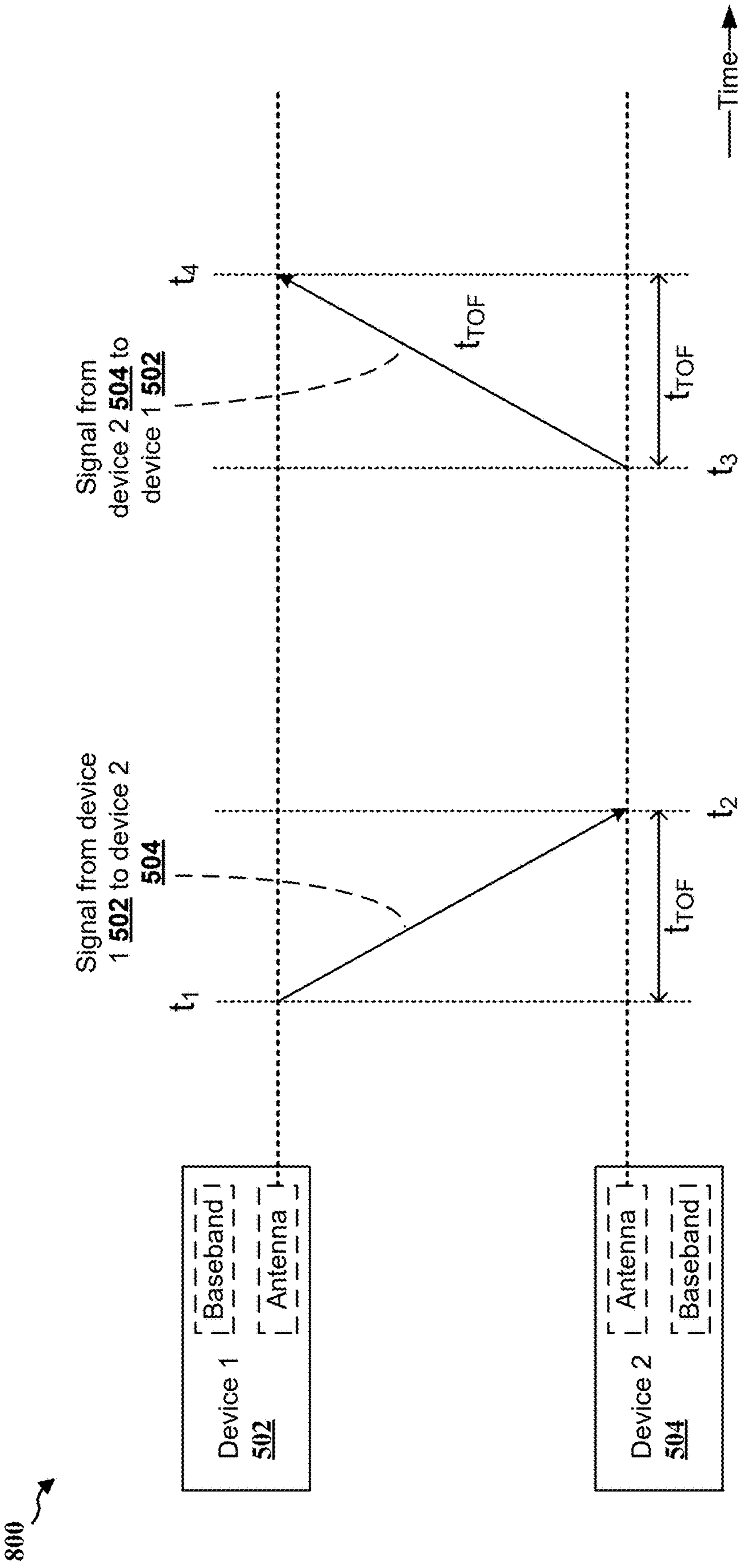
FIG. 8 is a diagram illustrating an example procedure for round-trip time (RTT)/ToF estimation between two wireless devices in accordance with various aspects of the present disclosure.

FIG. 8 is a diagram 800 illustrating an example procedure for round-trip time (RTT)/time-of-flight (ToF) estimation between two wireless devices in accordance with various aspects of the present disclosure. As discussed in connection with FIGS. 5 and 6, wireless tracking/ranging technologies (such as based on UWB, Wi-Fi, or BT, etc.) may rely on measuring the ToF of wireless signals sent between wireless devices. For example, an estimation of the ToF between the first device 502 and the second device 504 may be based on measuring the departure time and the arrival time for a wireless signal, then using the formula:

$$t_{TOF} = \frac{(t_4 - t_1) - (t_3 - t_2)}{2}$$

Then the distance ($d_{TOF}$) between both devices may be estimated by multiplying the ToF by the speed of light (c):

$$d_{TOF} = c \cdot t_{TOF}$$

This formula and calculation may represent an ideal case and work fine if the times $t_1$, $t_2$, $t_3$, $t_4$ are able to be accurately measured. Note $t_1$ and $t_4$ may be measured by the first device 502, and $t_2$ and $t_3$ may be measured by the second device 504 (and then shared with the first device 502).

Figure 9:
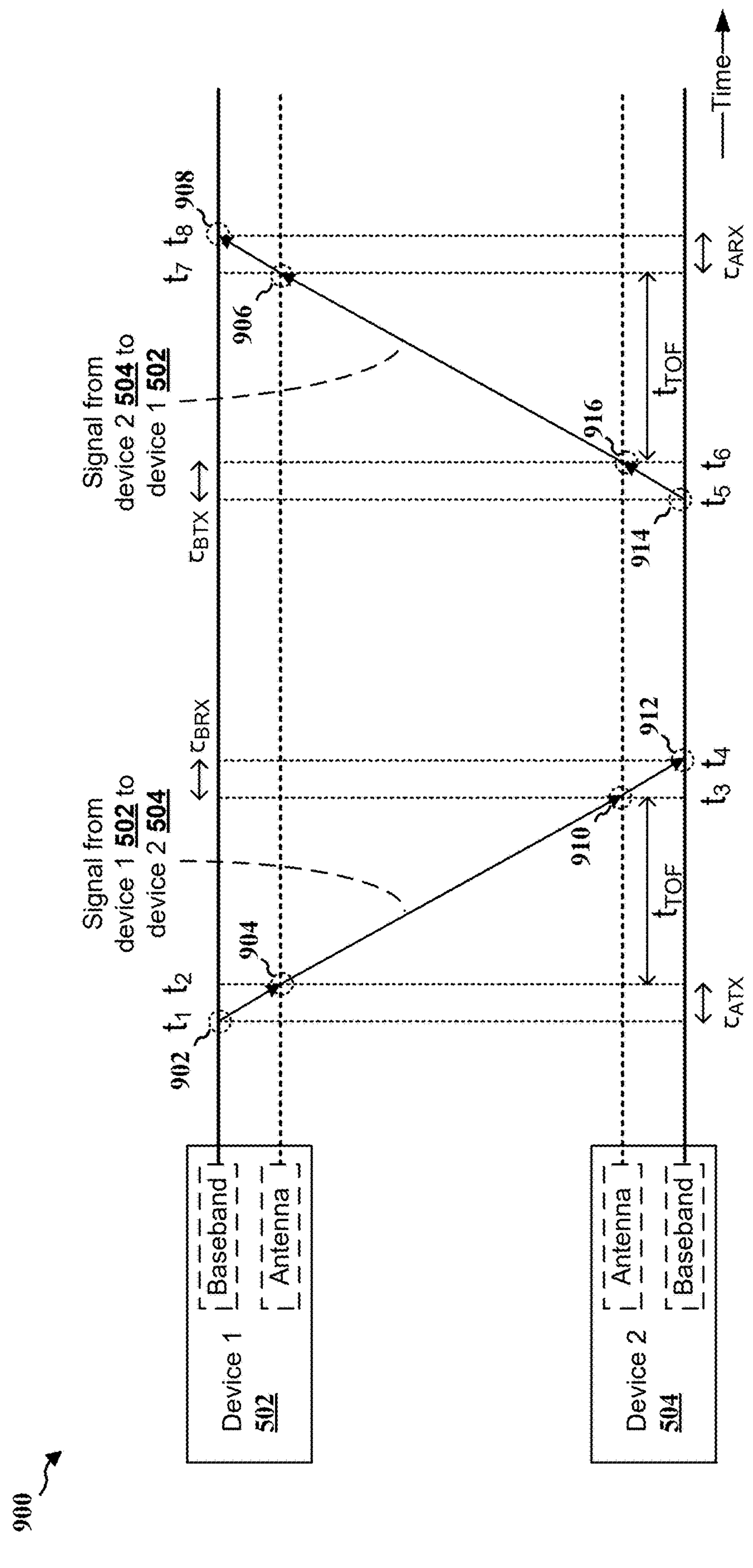
FIG. 9 is a diagram illustrating an example procedure for RTT/ToF estimation between two wireless devices that includes effect of device-specific delay in accordance with various aspects of the present disclosure.

FIG. 9 is a diagram 900 illustrating an example procedure for RTT/ToF estimation between two wireless devices that includes effect of device-specific delay in accordance with various aspects of the present disclosure. In a real system, it is less likely that the arrival time and the departure time can be measured exactly, because the RF signals may suffer delays due to hardware components such as filters, amplifiers, and/or antennas, etc. In other words, physical and/or electrical constraints in a wireless device may introduce timing errors associated with the transmission and/or reception of a signal. For example, when a wireless device transmits a signal (which may be referred to as a "transmitting device" or a "transmitting wireless device"), there may be a time delay from the time when a signal is generated (e.g., by a baseband of the wireless device) to the time when the signal is transmitted from the transmission (Tx) antenna of the wireless device. Similarly, when a wireless device receives a signal (which may be referred to as a "receiving device" or a "receiving wireless device"), from a signal reception perspective, there may also be a time delay from the time when a signal arrives at the reception (Rx) antenna of the wireless device to the time when the signal is processed and time-stamped at the baseband of the wireless device.

For example, as shown by the diagram 900, the first device 502 may include a baseband and an antenna (and/or other types of components related to wireless transmission). When the first device 502 transmits a signal to the second device 504, there may be a time delay from the time (e.g., $t_1$) when the signal is generated at the baseband (e.g., as shown at 902) to the time (e.g., $t_2$) when the signal is transmitted from the antenna (e.g., as shown at 904). In other words, the first device 502 may attempt to transmit a data frame at time $t_1$, but due to delays the signal may not leave the antenna until time $t_2$. When the first device 502 receives a signal transmitted from the second device 504, there may also be a similar time delay from the time (e.g., $t_7$) when the signal arrives at the antenna (e.g., as shown at 906) to the time (e.g., $t_8$) when the signal is processed and time-stamped at the baseband (e.g., as shown at 908).

Similarly, the second device 504 may include a baseband and an antenna (and/or other types of components related to wireless transmission). When the second device 504 receives a signal transmitted from the first device 502, there may be a time delay from the time (e.g., $t_3$) when the signal arrives at the antenna (e.g., as shown at 910) to the time (e.g., $t_4$) when the signal is processed and time-stamped at the baseband (e.g., as shown at 912). When the second device 504 transmits a signal to the first device 502, there may also be a time delay from the time (e.g., $t_5$) when the signal is generated at the baseband (e.g., as shown at 914) to the time (e.g., $t_6$) when the signal is transmitted from the antenna (e.g., as shown at 916). Table 2 below shows an example of a measured event time and a true event time between the first device 502 (denoted by "A") and the second device 504 (denoted by "B").

TABLE 2

Example of Measured Event Time vs True Event Time

| Event | Measured Event Time | True Event Time |
|---|---|---|
| A→B departure | $t_1$ | $t_2$ |
| A→B arrival | $t_4$ | $t_3$ |
| B→A departure | $t_5$ | $t_6$ |
| B→A arrival | $t_8$ | $t_7$ |

Thus, a ToF with an offset ($\hat{E}_{TOF}$) (which may also be referred to as a "delay") is measured between the wireless devices instead of the correct/ideal ToF ($t_{TOF}$):

$$\hat{t}_{TOF} = t_{TOF} + \frac{(t_8 - t_7) + (t_2 - t_1) + (t_6 - t_5) + (t_4 - t_3)}{2}$$

$$\hat{d}_{TOF} = c \cdot \hat{t}_{TOF} = d_{TOF} + c \cdot t_{OFFSET}$$

To correct (e.g., compensate) this delay/offset, communication systems may be calibrated to estimate the delays incurred by its RF chains, which may include antennas, filters, amplifiers, switches, etc. For example, the first device 502 may be configured to measure ($t_2$–$t_1$) and ($t_8$–$t_7$) and then subtract those times from ToF estimates. Similarly, the second device 504 may be configured to measure ($t_4$–$t_3$) and ($t_6$–$t_5$) and then subtract those times from ToF estimates. For purposes of the present disclosure, a measured ToF that includes a delay/offset may be referred to as a "biased ToF," and a measured RTT that includes a delay/offset may be referred to as a "biased RTT." However, as discussed above, calibration of wireless devices may incur extra time and cost for manufacturers.

Aspects presented herein may improve the overall performance of wireless tracking and ranging by enabling a tracking device to accurately estimate the distance of a target device based on ToF, where at least one of the tracking device or the target device may be using uncalibrated antenna(s), uncalibrated radio(s), and/or uncalibrated element(s) in an RF chain (or without antenna/radio/RF chain calibration). Then, the tracking device may also determine the position of the target device after multiple distances at different locations are available/measured, such as based on using a triangulation technique (e.g., some form of virtual triangulation). For example, in one aspect of the present disclosure, a wireless device may be configured to rely on difference in ToF between multiple wireless device positions, instead of the actual ToF value, removing the specification for accurate antenna calibration. Aspects presented herein may bring significant benefits, such as enabling a wireless device to perform high accuracy tracking without specifying the manufacturer of the wireless device (e.g., the tracking device, the target device, etc.) to incur cost and time to calibrate the wireless device. In addition, aspects presented herein also enable location/ranging capabilities to be extended to low-end devices for which it may not be economically feasible to spend significant amount of factory test time performing antenna and RF chain calibration.

In one aspect of the present disclosure, a tracking device (e.g., a mobile phone, the first device 502, etc.) may be configured to track its position and orientation while measuring ToF against a target device (e.g., another mobile phone, the second device 504, a pair of Bluetooth earbuds, etc.). For example, the tracking device may use its camera(s) and/or inertial measurement unit(s) (IMU(s)) to keep track of its position and orientation while measuring the ToF of signals between the tracking device and the target device as described in connection with FIGS. 8 and 9. The tracking device may measure the ToF using uncalibrated antenna(s), uncalibrated radio(s), and/or uncalibrated element(s) in an RF chain, which may introduce an unknown constant offset w. Based on the unknown offset w may remain constant across multiple ToF measurements, the tracking device may build/generate a loss function based on the tracked position and/or orientations of the tracking device and the ToF measurements, where the loss function is capable of estimating how likely or unlikely the target device is at specific location/point. Then, the tracking device may be configured to use at least one optimization technique, such as gradient descent (GD)/gradient ascent (GA), to find a location/point (e.g., a set of two-dimensional (2D)/three-dimensional (3D) coordinates) that achieves a minimum/maximum value for the loss function (which may also be referred to as finding a global minimum/maximum for the loss function). For example, if a set of 2D/3D coordinates input to the loss function yields a small value, it may indicate that the target device is close to that set of 2D/3D coordinates. On the other hand, if a set of 2D/3D coordinates input to the loss function yields a large value, it may indicate that the target device is far/farther away from that set of 2D/3D coordinates (compared to a smaller value).

For purposes of the present disclosure, it may be assumed that the tracking device and the target device support at least one type of (common) wireless ranging technologies, such as UWB, BTCS and/or Wi-Fi, etc., for measuring the (biased) ToF between themselves. Also, aspects presented herein may not specify the tracking device to rely on having calibrated RF chains for ToF estimation between the tracking device and the target device, they may just specify/assume the tracking device to have an unknown constant offset (w) for all ToF measurements (e.g., so that $r_i = \rho_i + \omega$ which will be discussed below). Aspects presented herein may also rely on the tracking device having the capability to track its position(s) and orientation(s) (while the tracking device or the user carrying the tracking device is moving) and then combining the (biased) ToF (e.g., ranging) measurements taken at each position to determine the location (e.g., the relative distance and direction) of the target device from the tracking device. Depending on implementations, to ensure the position of the tracking device is accurate (e.g., exceeding a minimum specified accuracy threshold), the tracking device may be configured to use both IMU(s) (e.g., accelerometers, magnetometers, gyroscopes, etc.) and camera(s) to determine its positions and/or orientations.

Figure 10:
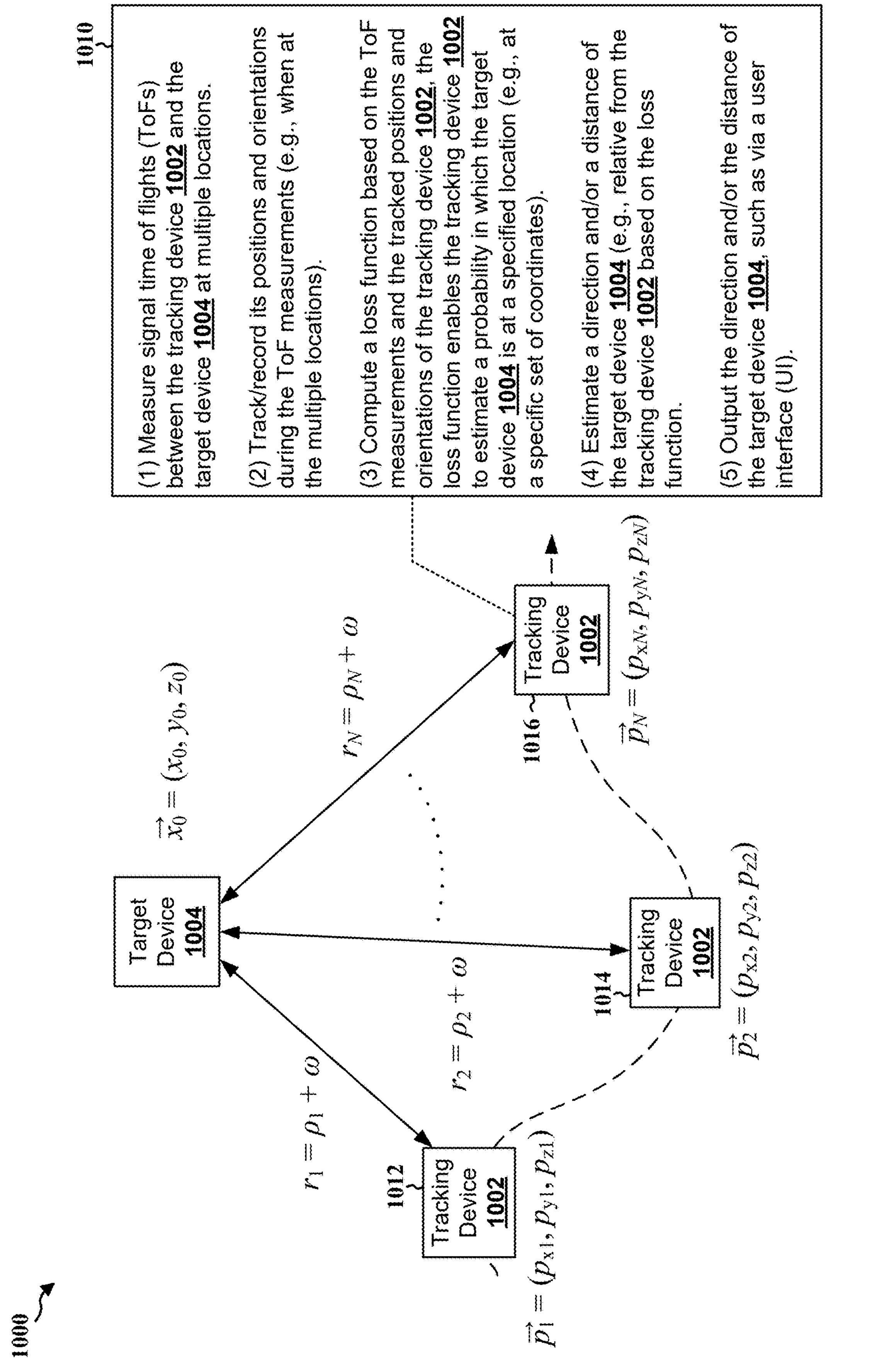
FIG. 10 is a diagram illustrating an example of a tracking device estimating the location of a target device based on ToF without antenna calibration in accordance with various aspects of the present disclosure.

FIG. 10 is a diagram 1000 illustrating an example of a tracking device estimating the location of a target device based on ToF without antenna calibration in accordance with various aspects of the present disclosure. In one example, as shown at 1010, a tracking device 1002 (e.g., a mobile phone, the first device 502, etc.) may be configured to measure the signal ToF between the tracking device 1002 and a target device 1004 (e.g., another mobile device, a mobile accessory, the second device 504, etc.) at multiple locations. In some examples, the measured ToF may be converted to a distance ($r_i$) after multiplying the ToF with the speed of light (c), which may be referred to as the ToF distance. In addition, the tracking device 1002 may be configured to track/record its positions and orientations during the ToF measurements (e.g., when at the multiple locations).

For purposes of the illustration, the location of the tracking device 1002 at time $t_i$ may be denoted by $\vec{p}_i$. In some implementations, the location may correspond to a set of two-dimensional (2D) coordinates (e.g., $\vec{p}_i=(p_{x_i}, p_{y_i})$) or a set of three-dimensional (3D) coordinates (e.g., $\vec{p}_i=(p_{x_i}, p_{y_i}, p_{z_i})$). In addition, the distance between the tracking device 1002 and the target device 1004 at time $t_i$ (e.g., at each of the multiple locations) may be estimated and denoted by $r_i=\rho_i+\omega$, where $r_i$ is the (biased/incorrect) measured ToF distance to the target device 1004 at time $t_i$, $\rho_i$ is the true (unknown) ToF distance to the target device 1004 at time $t_i$, and $\omega$ is the unknown constant offset.

For example, as shown at 1012, when the tracking device 1002 is at a first location ($\vec{p}_1=(p_{x_1}, p_{y_1}, p_{z_1})$) at a first point in time ($t_1$), the tracking device 1002 may perform ranging against the target device 1004 (e.g., transmit signal to and receive signal from the target device 1004) to obtain a first (biased) ToF distance ($r_1$) (e.g., by multiplying the ToF of signal(s) with the speed of light) between the tracking device 1002 and the target device 1004. This first (biased) ToF distance ($r_1$) may include a true distance ($\rho_1$) between the tracking device 1002 and the target device 1004 and include a constant offset $\omega$ (which the value is unknown). In other words, $r_1=\rho_1+\omega$. This offset $\omega$ (e.g., from RF chain(s)) is likely to remain constant across multiple ToF measurements based on:

$$\Delta r_{ij} = r_i - r_j = (\rho_i + \omega) - (\rho_j + \omega) = \rho_i - \rho_j = \Delta\rho_{ij}$$

Similarly, as shown at 1014, when the tracking device 1002 is at a second location ($\vec{p}_2=(p_{x_2}, p_{y_2}, p_{z_2})$) at a second point in time ($t_2$), the tracking device 1002 may perform another ranging against the target device 1004 to obtain a second (biased) ToF distance ($r_2$) between the tracking device 1002 and the target device 1004. This second (biased) ToF distance ($r_2$) may include a true distance ($\rho_2$) between the tracking device 1002 and the target device 1004 and also the same constant offset (e.g., as discussed above). In other words, $r_2=\rho_2+\omega$. Then, as shown at 1016, when the tracking device 1002 is at an $N^{th}$ location ($\vec{p}_N=(p_{x_N}, p_{y_N}, p_{z_N})$) at an $N^{th}$ point in time ($t_N$), the tracking device 1002 may perform another ranging against the target device 1004 to obtain an $N^{th}$ (biased) ToF distance ($r_N$) between the tracking device 1002 and the target device 1004. This $N^{th}$ (biased) ToF distance ($r_N$) may also include a true distance ($\rho_N$) between the tracking device 1002 and the target device 1004 and the same constant offset $\omega$. In other words, $r_N=\rho_N+\omega$. As such, the tracking device 1002 may track and record its position(s) and orientation(s) when performing the ToF measurements against the target device 1004 at multiple locations.

Referring back to 1010, after the tracking device 1002 obtains a set of distances (e.g., $r_1$ to $r_N$) between the tracking device 1002 and the target device 1004 at multiple locations (e.g., $\vec{p}_1$ to $\vec{p}_N$), the tracking device 1002 may compute a loss function based on the set of distances and the tracked locations (which may also include orientations) of the tracking device 1002, where this loss function is associated with a probability in which the target device 1004 is at a specified location. In other words, using $\vec{p}_i$ and $r_i$ a loss function $\mu(\vec{x})$ may be built that tells how likely/unlikely it is that target device 1004 is at $\vec{x}$ (e.g., $\vec{x}=(x, y, z)$). Based on using the loss function, the tracking device 1002 may estimate the direction and/or the distance of the target device 1004 (e.g., with respect to the tracking device 1002).

Figure 11A:
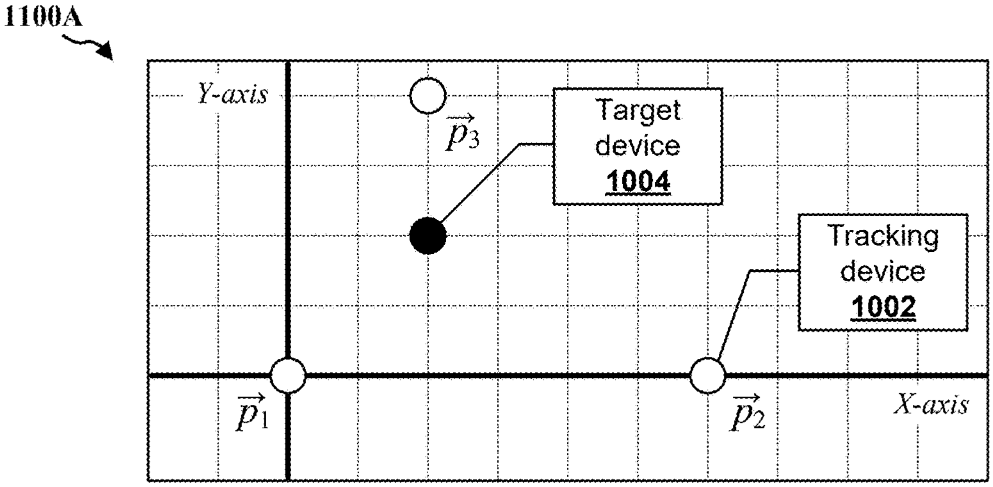
FIG. 11A is a diagram illustrating an example of a tracking device locating a target device with measured ToFs (or ToF distances) from three locations in accordance with various aspects of the present disclosure.
Figure 11B:
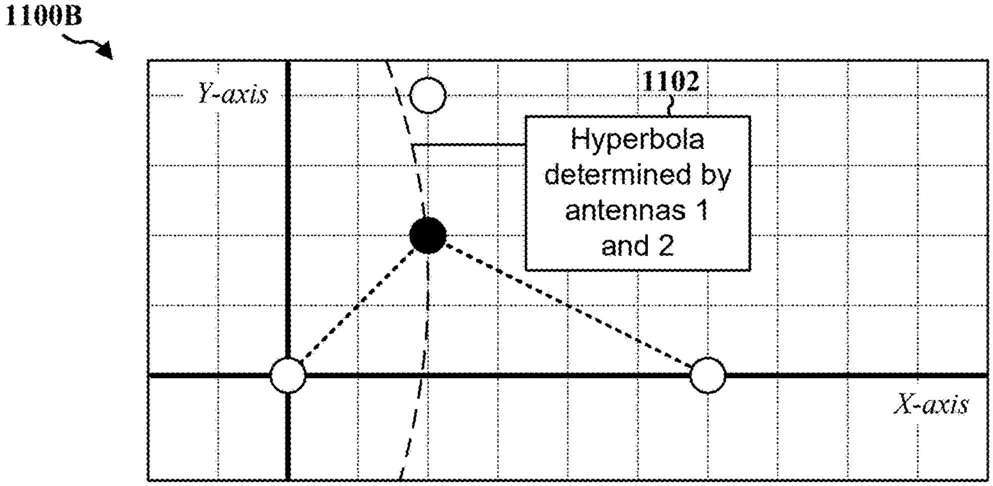
FIG. 11B is a diagram illustrating an example of a tracking device locating a target device with measured ToFs (or ToF distances) from three locations in accordance with various aspects of the present disclosure.
Figure 11C:
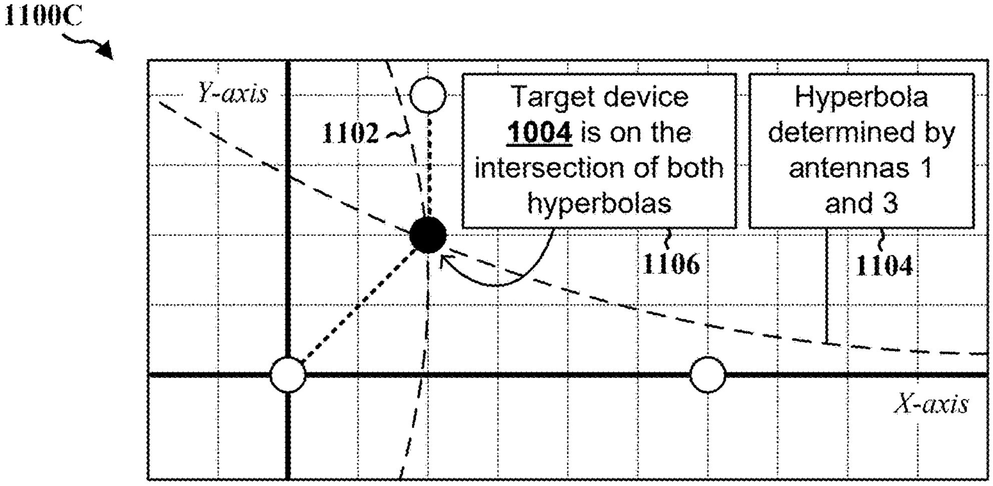
FIG. 11C is a diagram illustrating an example of a tracking device locating a target device with measured ToFs (or ToF distances) from three locations in accordance with various aspects of the present disclosure.

FIGS. 11A, 11B, and 11C are diagrams 1100A, 1100B, and 1100C, respectively, illustrating an example of a tracking device locating a target device with measured ToFs (or ToF distances) from three locations in accordance with various aspects of the present disclosure. For ease of visualization, the concept described herein is illustrated with 2D graphs. However, in most implementations, more complex 3D graphs are likely to be used.

As shown by the diagram 1100A of FIG. 11A, to determine the location (e.g., the relative distance and/or direction) of the target device 1004, the tracking device 1002 may be configured to perform ranging against the target device 1004 at multiple locations, such as at a first location $\vec{p}_1$, a second location $\vec{p}_2$, and a third location $\vec{p}_3$. As described in connection with FIG. 10, at each of the three locations, the tracking device 1002 may measure the signal ToF or the ToF distance (e.g., $r_1$, $r_2$, and $r_3$, respectively) between the tracking device 1002 and the target device 1004, where the measured signal ToF or ToF distance may include an unknown offset $\omega$ (e.g., $r_i=\rho_i+\omega$).

As shown by the diagram 1100B of FIG. 11B, based on $\Delta r_{12}=r_1-r_2$, the target device 1004 is located at some point on the hyperbola shown at 1102. Similarly, as shown by the diagram 1100C of FIG. 11C, based on $\Delta r_{13}=r_1-r_3$, the target device 1004 is located at some point on the hyperbola shown at 1104. Then, as shown at 1106, the tracking device 1002 may determine the location of the target device 1004 based on finding the intersection of the two hyperbolas. In other words, the target device 1004 is located on the intersection of both hyperbolas shown at 1102 and 1104.

Figure 12:
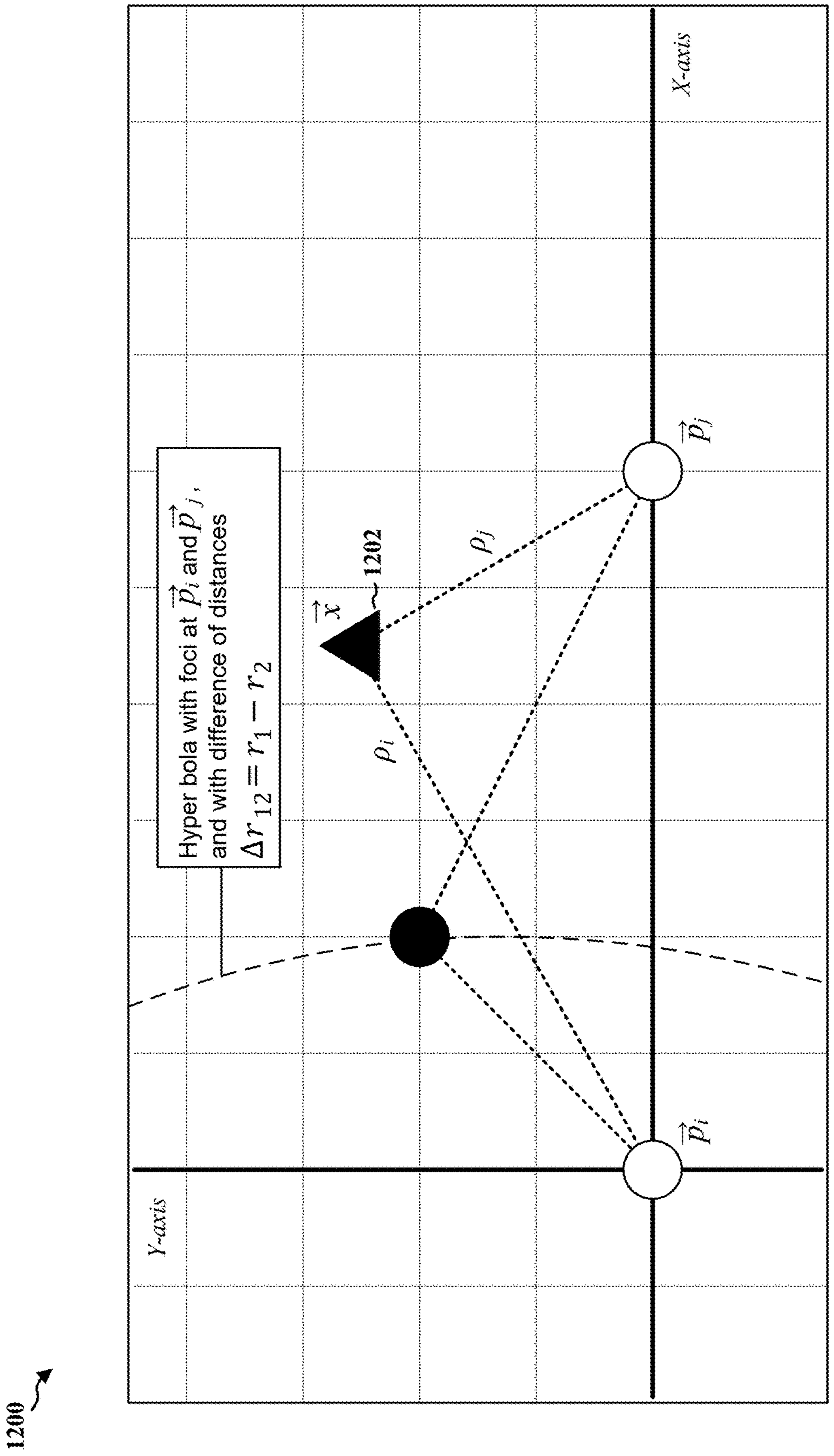
FIG. 12 is a diagram illustrating an example of a tracking device locating a target device based on using a loss function in accordance with various aspects of the present disclosure.

FIG. 12 is a diagram 1200 illustrating an example of a tracking device locating a target device based on using a loss function in accordance with various aspects of the present disclosure. In one aspect, to estimate the direction and/or the distance of the target device 1004 based on a loss function, the tracking device 1002 may be configured to calculate a minimum for the computed loss function using a minimization technique, and estimate the direction and/or the distance of the target device 1004 (e.g., relative to the tracking device 1002) based on the calculated minimum for the computed loss function. The minimization technique may include gradient descent (GD) and/or an exhaustive search. Note while the examples are illustrated with using a minimization technique, the tracking device 1002 may also be configured to calculate a maximum for the computed loss function using a maximization technique. In other words, the tracking device 1002 may be configured to calculate an extremum for the computed loss function using at least one optimization technique, and estimate at least one of the direction or the distance of the target device 1004 from the tracking device 1002 based on the calculated extremum for the computed loss function. In some implementations, the at least one optimization technique includes at least one of a gradient descent/ascent or an exhaustive search. For example, the tracking device 1002 may be configured to calculate a minimum for the computed loss function using at least one minimization technique (e.g., the gradient descent), and estimate at least one of the direction or the distance of the target device 1004 from the tracking device 1002 based on the calculated minimum for the computed loss function. In another example, the tracking device 1002 may be configured to calculate a maximum for the computed loss function using at least one maximization technique (e.g., the gradient ascent), and estimate at least one of the direction or the distance of the target device 1004 from the tracking device 1002 based on the calculated maximum for the computed loss function.

For example, as shown at 1202, at each point in a space $\vec{x}$, the tracking device 1002 may compute the value of a loss function $\mu(\vec{x})$ given by:

$$\mu_{ij}(\vec{x}) = \frac{1}{2}\left(\frac{\Delta\rho_{ij} - \Delta r_{ij}}{\sigma_{ij}}\right)^2 = \frac{1}{2}\left(\frac{(\rho_i - \rho_j) - (r_i - r_j)}{\sigma_{ij}}\right)^2 = \frac{1}{2}\left(\frac{(\|\vec{x} - \vec{p}_i\| - \|\vec{x} - \vec{p}_j\|) - (r_i - r_j)}{\sigma_{ij}}\right)^2$$

where $\sigma_{ij}$ may represent the standard deviation of the ToF measurement process for i and j $$\left(\text{e.g., } \sigma_{ij} = \sqrt{(\sigma_i^2 + \sigma_j^2)}\right).$$

This loss function may be built in such a way that: (1) points on the hyperbola have a value of zero, (2) points near the hyperbola have a small value, and (3) points (farther) away from the hyperbola have a large value. Thus, the loss function enables the tracking device 1002 to evaluate the goodness of a candidate point $\vec{x}$, where the tracking device may just take into account multiple or all pairs of positions $\vec{p}_i$ and $\vec{p}_j$:

$$\mu(\vec{x}) = \sum_{i=1}^{N-1}\sum_{j=i+1}^{N}\mu_{ij}(\vec{x}) = \sum_{i=1}^{N-1}\sum_{j=i+1}^{N}\frac{1}{2}\left(\frac{(\|\vec{x} - \vec{p}_i\| - \|\vec{x} - \vec{p}_j\|) - (r_i - r_j)}{\sigma_{ij}}\right)^2$$

The best or the most suitable estimate for the location of the target device 1004 may be at the point that minimizes $\mu(\vec{x})$:

$$\vec{x}^* = \underset{\vec{x}}{\operatorname{argmin}}\{\mu(\vec{x})\}$$

where the minimization may be achieved using standard techniques like gradient descent and/or exhaustive search. Depending on the implementations, the loss function may be built based on a positive likelihood associated with the probability, such that the direction and/or the distance of the target device 1004 with respect to the tracking device 1002 is a position at which the positive likelihood is maximized. Alternatively, the loss function may be built based on a negative likelihood associated with the probability, such that the direction and/or the distance of the target device 1004 with respect to the tracking device 1002 is a position at which the negative likelihood is minimized.

Figure 13:
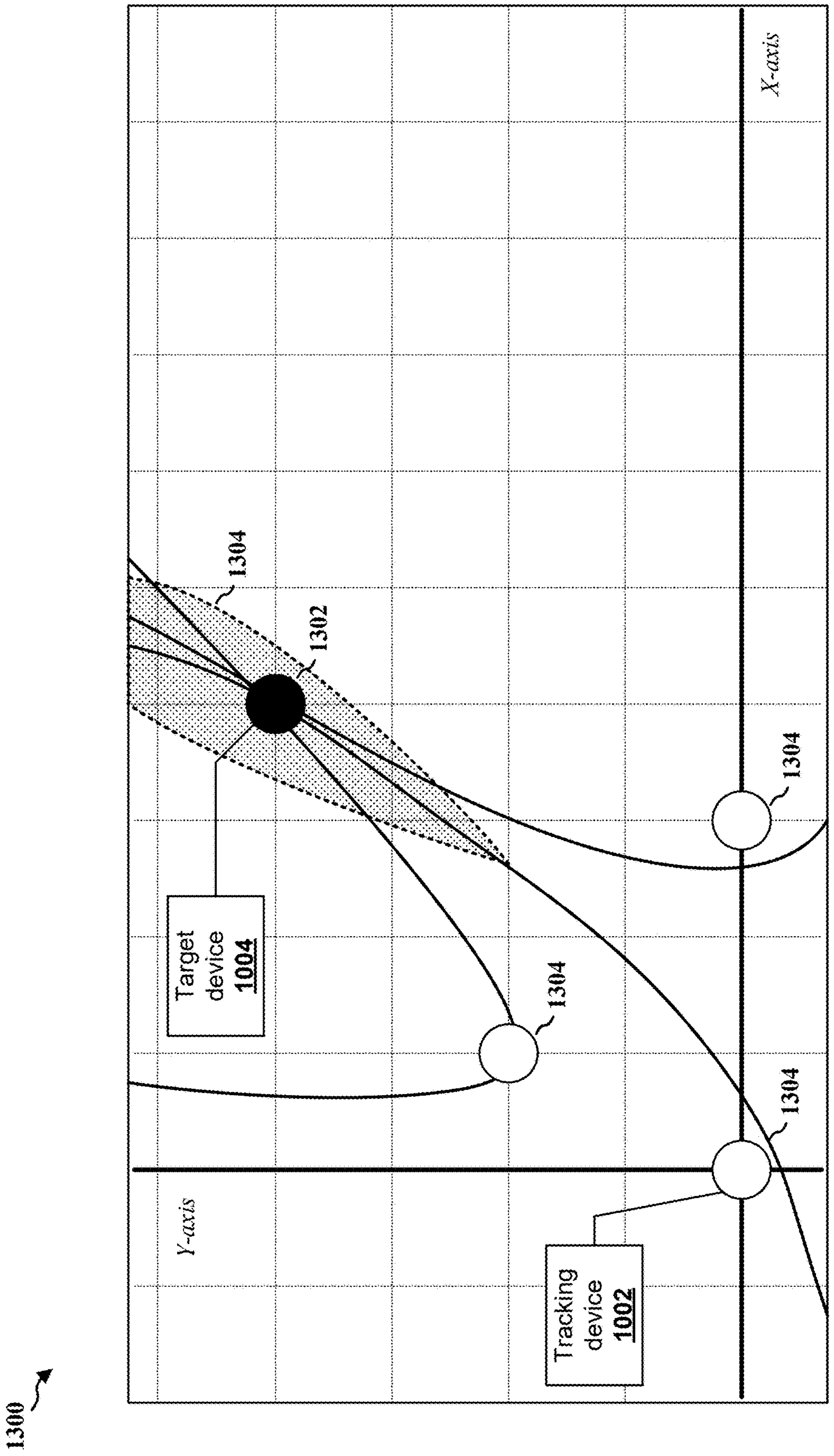
FIG. 13 is a diagram illustrating an example visualization of a loss function in accordance with various aspects of the present disclosure.

FIG. 13 is a diagram 1300 illustrating an example visualization of a loss function in accordance with various aspects of the present disclosure. As shown at 1302, when the target device 1004 is at a point far away from the tracking device 1002, the hyperbolas may appear almost parallel near their intersection point. This may translate into a shape for the loss function $\mu(\vec{x})$ that takes a similar small value for many points that are part of an elongated region of space. For example, as shown at 1304, the elongated region of space may indicate the set of all points for which $\mu(\vec{x})$ is very close to zero. This means that the tracking device 1002 may have the capability to pinpoint the overall direction to the target device 1004, but may not be able to estimate the distance accurately. Thus, in some examples, a user interface (UI) of an application (running on the tracking device 1002) that uses this technique (e.g., aspects described in connection with FIGS. 8 to 10) may be specified to first show the direction to the target device 1004 (with no distance), and later the UE may start to show a distance estimate (e.g., after the tracking device 1002 or the user of the tracking device 1002 has moved to a point that generates hyperbolas that intersect closer to) 90°, such as described in connection with FIG. 7A.

Figure 7B:
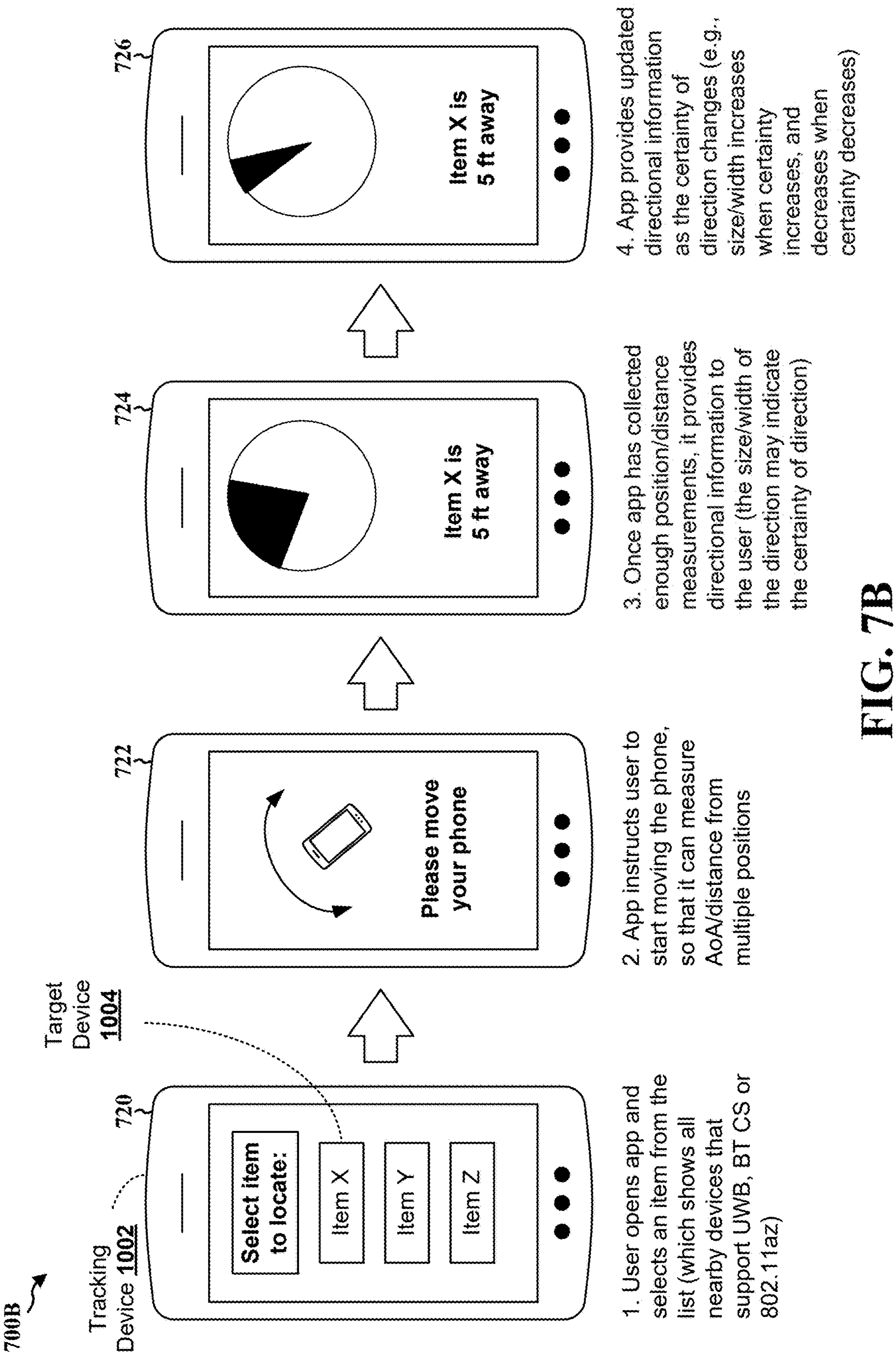
FIG. 7B is a diagram illustrating an example user experience of a tracking device locating a target device in accordance with various aspects of the present disclosure.

FIG. 7B is a diagram 700B illustrating another example user experience of a tracking device locating a target device in accordance with various aspects of the present disclosure. In another example, the tracking device 1002 may be configured to display (via the UI) an estimated direction of the target device 1004 using different sizes/widths of directional displays (e.g., different sizes/widths of an arrow, a circular section, etc.). For example, as shown at 720, the tracking device 1002 may instruct the user (e.g., via the UI) to select an item (e.g., from a list of detected items) for tracking/locating. As shown at 722, after the user selects an item (e.g., item X) that is associated with the target device 1004, the tracking device 1002 may instruct the user to move the tracking device 1002, such that the tracking device 1002 may be able to measure the distance and/or the AoA between the tracking device 1002 and the target device 1004 from multiple positions. As shown at 724, after the tracking device 1002 has collected sufficient AoA/distance measurements, the tracking device 1002 may start providing directional information (and the distance information) of the target device 1004 to the user, such as by showing the direction of the target device 1004 with respect to the tracking device 1002. Then, as shown at 726, the tracking device 1002 may continue to update the directional information (and the distance information) of the target device 1004 as the user moves, and may stop the update after the user locates the target device 1004 (e.g., after the tracking device 1002 is within a threshold distance of the target device 1004).

In one aspect of the present disclosure, as shown at 724 and 726, the tracking device 1002 may display an estimated direction of the target device 1004 with a circular sector that is capable of changing its size/width based on the certainty of the direction of the target device 1004. For example, as shown at 724, when the tracking device 1002 is less certain about the direction of the target device 1004, the tracking device 1002 may display a larger circular sector that is indicative of the approximate/potential direction of the target device 1004. As shown at 726, when the tracking device 1002 is more certain about the direction of the target device 1004 (e.g., after more measurements are taken), the tracking device 1002 may display a narrower circular sector that is indicative of a more exact direction of the target device 1004. On the other hand, if the tracking device 1002 is more uncertain about the direction of the target device 1004, the tracking device 1002 may display an even larger circular sector that is indicative of the approximate/potential direction of the target device 1004. Note the use of a circular sector with different sizes is merely for illustrative purposes. Other directional graphics may also be used for displaying the direction of the target device 1004, such as an arrow with different sizes and/or colors, etc. In other words, the UI may include a graphical user interface (GUI) configured to display a graphical icon that is configured to move or change size as the tracking device 1002 is moved.

An advantage of providing directional information of the target device 1004 using a graphical icon (e.g., a circular sector, an arrow, etc.) with changeable size/width is that the tracking device 1002 may provide directional information without giving false impression of accuracy. As the tracking device 1002 moves and the angular accuracy changes, the tracking device 1002 may indicate to the user regarding the angular accuracy based on making the graphical icon narrower or wider. This may also enable the tracking device 1002 to continue to show some directional information for longer when the tracking device 1002 is close to the target device 1004.

In some implementations, to improve the accuracy of the positioning, the tracking device 1002 may be configured to assign/adjust a weight for each ToF measurement based on a set of criteria, where a ToF measurement that meets the set of criteria may be given a higher or a lower weight compared to a ToF measurement that does not meet the criteria. For example, the tracking device 1002 may be configured to use lower weights for samples taken earlier in time (e.g., to take into account potential drift of the position accuracy of the tracking device 1002) compared to samples taken later in time. In another example, the tracking device 1002 may be configured to use lower weights (that is, higher values for $\sigma_{ij}$) for samples taken while the tracking device 1002 was moving very fast or above a speed threshold (e.g., to take into account that the position of the tracking device 1002 may be less accurate when the tracking device 1002 is moving fast). In another example, the tracking device 1002 may be configured to use lower weights if the target device 1004 has moved (e.g., to take into account that samples taken before the target device 1004 moved may not be valid anymore). In another example, the tracking device 1002 may be configured to use signal strength to determine weights (e.g., to take into account that the value of $\sigma_{ij}$ may be higher than typical).

Referring back to 1010 of FIG. 10, after the tracking device 1002 estimates a direction and/or the distance of the target device 1004, the tracking device 1002 may be configured to output the direction and/or the distance of the target device 1004 (or output an indication of a point at which the computed loss function is minimized), such as via a user interface (UI). This may include transmitting, storing, and/or displaying the direction and/or the distance of the target device 1004 (or the indication of the point).

Aspects presented herein may improve the overall performance of wireless tracking and ranging by enabling a tracking device to accurately estimate the distance of a target device based on ToF, where at least one of the tracking device or the target device may be using uncalibrated antenna(s), uncalibrated radio(s), and/or uncalibrated element(s) in an RF chain (or without antenna/radio/RF chain calibration). Then, the tracking device may also determine the position of the target device after multiple distances at different locations are available/measured, such as based on using a triangulation technique (e.g., some form of virtual triangulation). An alternative solution may specify a tracking device to rely on having an accurate calibration of their RF chains in order to get accurate RTT estimates, where such calibration may be specified to be performed for each combination of: radio type (e.g., UWB, Wi-Fi, BT), frequency band (e.g., 2.4 GHz, 5 GHZ, 6 GHZ), channel, filter setting, gain setting, and/or antenna, etc. Thus, the calibration time could take several minutes per tracking device, which may make it impractical or uneconomical except for certain high-end tracking devices (e.g., premium phones), and may just for a subset of radios (e.g., just for UWB). As aspects presented herein do not specify an accurate calibration, it may enable "lost item" finding use cases in wireless devices with uncalibrated antennas, uncalibrated radio(s), and/or uncalibrated element(s) in an RF chain (e.g., value-tier phones).

Figure 14:
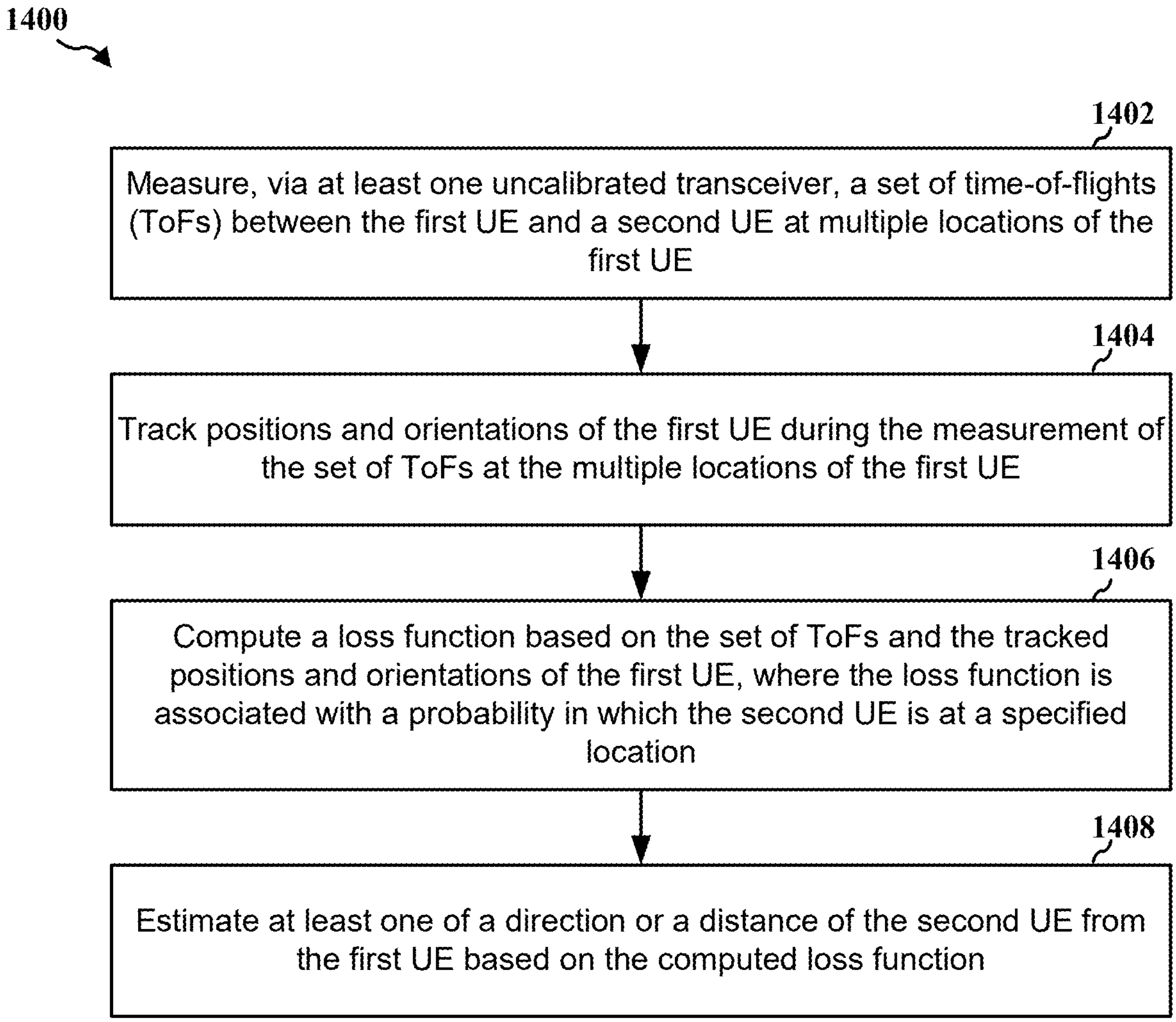
FIG. 14 is a flowchart of a method of wireless communication.

FIG. 14 is a flowchart 1400 of wireless communication at a user equipment (UE) (e.g., a first UE). The method may be performed by a UE (e.g., the UE 104, 404; the first device 502; the tracking device 1002; the apparatus 1504). The method may enable a first UE to accurately estimate the distance of a second UE (e.g., a target device) based on ToF using uncalibrated antenna(s) (or without antenna calibration).

At 1402, a first UE may measure a set of time-of-flights (ToFs) between the first UE and a second UE at multiple locations of the first UE, such as described in connection with FIG. 10. For example, as shown at 1010, a tracking device 1002 (e.g., a mobile phone, the first device 502, etc.) may be configured to measure the signal ToF between the tracking device 1002 and a target device 1004 (e.g., another mobile device, a mobile accessory, the second device 504, etc.) at multiple locations. The measurement of the set of ToFs may be performed by, e.g., the tracking component 198, the transceiver(s) 1522, the cellular baseband processor (s) 1524, and/or the application processor(s) 1506 of the apparatus 1504 in FIG. 15.

At 1404, the first UE may track positions and orientations of the first UE during the measurement of the set of ToFs at the multiple locations of the first UE, such as described in connection with FIG. 10. For example, as shown at 1010, the tracking device 1002 may be configured to track/record its positions and orientations during the ToF measurements (e.g., when at the multiple locations). The tracking of the positions and orientations of the first UE may be performed by, e.g., the tracking component 198, the transceiver(s) 1522, the one or more sensors 1518, the camera 1532, the cellular baseband processor(s) 1524, and/or the application processor(s) 1506 of the apparatus 1504 in FIG. 15.

At 1406, the first UE may compute a loss function based on the set of ToFs and the tracked positions and orientations of the first UE, where the loss function is associated with a probability in which the second UE is at a specified location, such as described in connection with FIG. 10. For example, as shown at 1010, after the tracking device 1002 obtains a set of distances (e.g., $r_1$ to $r_N$) between the tracking device 1002 and the target device 1004 at multiple locations (e.g., $\vec{p}_1$ to $\vec{p}_N$), the tracking device 1002 may compute a loss function based on the set of distances and the tracked locations (which may also include orientations) of the tracking device 1002, where this loss function is associated with a probability in which the target device 1004 is at a specified location. The computation of the loss function may be performed by, e.g., the tracking component 198, the transceiver(s) 1522, the cellular baseband processor(s) 1524, and/or the application processor(s) 1506 of the apparatus 1504 in FIG. 15.

At 1408, the first UE may estimate at least one of a direction or a distance of the second UE from the first UE based on the computed loss function, such as described in connection with FIG. 10. For example, as shown at 1010, based on using the loss function, the tracking device 1002 may estimate the direction and/or the distance of the target device 1004 (e.g., with respect to the tracking device 1002). The estimation of the direction and/or the distance of the second UE from the first UE may be performed by, e.g., the tracking component 198, the transceiver(s) 1522, the cellular baseband processor(s) 1524, and/or the application processor(s) 1506 of the apparatus 1504 in FIG. 15.

In one example, to estimate at least one of the direction or the distance of the second UE from the first UE based on the computed loss function, the first UE may be configured to calculate an extremum for the computed loss function using at least one optimization technique, and estimate at least one of the direction or the distance of the second UE from the first UE based on the calculated extremum for the computed loss function. In some implementations, the at least one optimization technique includes at least one of a gradient descent/ascent or an exhaustive search. For example, the first UE may be configured to calculate a minimum for the computed loss function using at least one minimization technique (e.g., the gradient descent), and estimate at least one of the direction or the distance of the second UE from the first UE based on the calculated minimum for the computed loss function. In another example, the first UE may be configured to calculate a maximum for the computed loss function using at least one maximization technique (e.g., the gradient ascent), and estimate at least one of the direction or the distance of the second UE from the first UE based on the calculated maximum for the computed loss function.

In another example, to compute the loss function based on the set of ToFs and the tracked positions and the orientations of the first UE, the first UE may be configured to calculate one distance ($r_i$) between the first UE and the second UE at each location ($\vec{p}_N$) of the multiple locations of the first UE, and configure the loss function based on differences between the multiple calculated distances ($r_i$) between the first UE and the second UE at the multiple locations ($\vec{p}_N$). In some implementations, the calculated distance at each location of the multiple locations of the first UE is associated with a constant unknown offset ($\omega$). In some implementations, to configure the loss function, the first UE may be configured to build the loss function based on a positive likelihood associated with the probability, where at least one of the estimated direction or the estimated distance is a position at which the positive likelihood is maximized. In some implementations, to configure the loss function, the first UE may be configured to build the loss function based on a negative likelihood associated with the probability, where at least one of the estimated direction or the estimated distance is a position at which the negative likelihood is minimized.

In another example, the first UE may assign each ToF in the set of ToFs with a weight based on at least one of: a time at which each ToF is measured, a speed at which each ToF is measured, whether the second UE is moving while the ToF is measured, or a signal strength for each ToF is measured, where the computation of the loss function is further based on the assigned weight associated with each of the set of ToFs.

In another example, to measure the set of ToFs between the first UE and the second UE at the multiple locations of the first UE, the first UE may be configured to transmit a first signal to the second UE at each location of the multiple locations, receive a second signal from the second UE at each location of the multiple locations, and calculate a ToF for the first signal and the second signal for each location of the multiple locations to obtain the set of ToFs.

In another example, the first UE may output an indication of a point at which the computed loss function is minimized. In some implementations, to output the indication of the point, the first UE may be configured to transmit the indication of the point, store the indication of the point, or display the indication of the point.

In another example, to track the positions and the orientations of the first UE, the first UE may be configured to track the positions and the orientations of the first UE using at least one inertial measurement unit (IMU), at least one camera, or a combination thereof.

In another example, the first UE further includes at least one uncalibrated transceiver or radio, and wherein the at least one uncalibrated transceiver or radio includes at least one of: a Bluetooth® transceiver, a Wi-Fi® transceiver, or an ultra-wideband (UWB) transceiver.

In another example, the multiple locations of the first UE include at least three different locations of the first UE.

In another example, at least one of the first UE or the second UE includes at least one of an uncalibrated antenna, an uncalibrated radio, or a radio frequency (RF) chain with at least one uncalibrated element.

Figure 15:
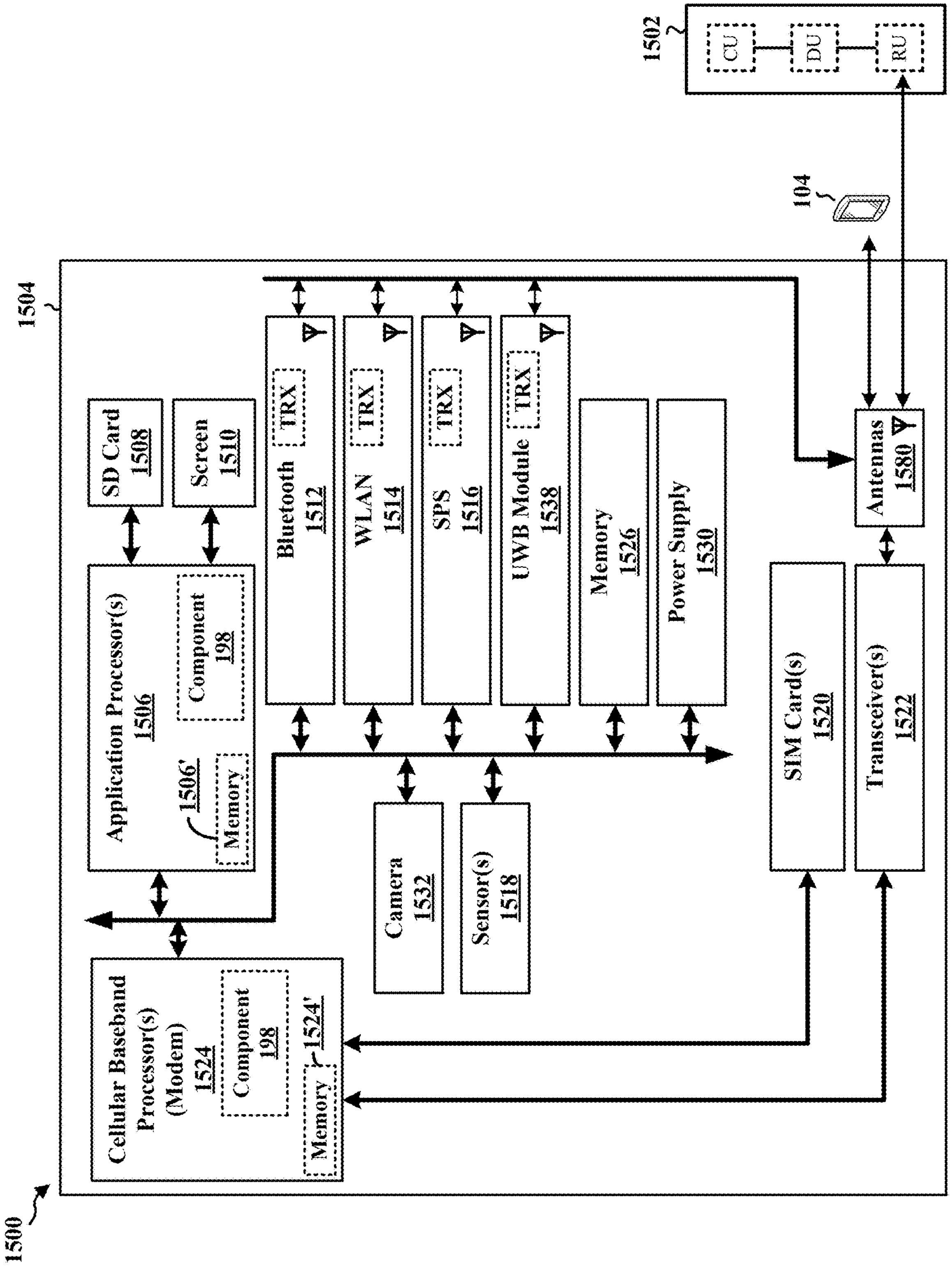
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE (e.g., a first UE), a component of a UE, or may implement UE functionality. In some aspects, the apparatus 1504 may include at least one cellular baseband processor 1524 (also referred to as a modem) coupled to one or more transceivers 1522 (e.g., cellular RF transceiver). The cellular baseband processor(s) 1524 may include at least one on-chip memory 1524'. In some aspects, the apparatus 1504 may further include one or more subscriber identity modules (SIM) cards 1520 and at least one application processor 1506 coupled to a secure digital (SD) card 1508 and a screen 1510. The application processor(s) 1506 may include on-chip memory 1506'. In some aspects, the apparatus 1504 may further include a Bluetooth module 1512, a WLAN module 1514, an ultrawide band (UWB) module 1538 (e.g., a UWB transceiver), an SPS module 1516 (e.g., GNSS module), one or more sensors 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the UWB module 1538, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor(s) 1524 communicates through the transceiver(s) 1522 via one or more antennas 1580 with the UE 104 and/or with an RU associated with a network entity 1502. The cellular baseband processor(s) 1524 and the application processor(s) 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor(s) 1524 and the application processor(s) 1506 are each responsible for general processing, including the execution of software stored on the computer-readable medium/memory. The software, when executed by the cellular baseband processor(s) 1524/application processor(s) 1506, causes the cellular baseband processor(s) 1524/application processor(s) 1506 to perform the various functions described supra. The cellular baseband processor(s) 1524 and the application processor(s) 1506 arc configured to perform the various functions described supra based at least in part of the information stored in the memory. That is, the cellular baseband processor(s) 1524 and the application processor(s) 1506 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1524/application processor(s) 1506 when executing software. The cellular baseband processor(s) 1524/application processor(s) 1506 may be a component of the UE 350 and may include the at least one memory 360 and/or at least one of the TX processor 368, the RX processor 356, and the controller/processor 359. In one configuration, the apparatus 1504 may be at least one processor chip (modem and/or application) and include just the cellular baseband processor(s) 1524 and/or the application processor(s) 1506, and in another configuration, the apparatus 1504 may be the entire UE (e.g., see UE 350 of FIG. 3) and include the additional modules of the apparatus 1504.

As discussed supra, the tracking component 198 may be configured to measure a set of ToFs between the first UE and a second UE at multiple locations of the first UE. The tracking component 198 may also be configured to track positions and orientations of the first UE during the measurement of the set of ToFs at the multiple locations of the first UE. The tracking component 198 may also be configured to compute a loss function based on the set of ToFs and the tracked positions and orientations of the first UE, where the loss function is associated with a probability in which the second UE is at a specified location. The tracking component 198 may also be configured to estimate at least one of a direction or a distance of the second UE from the first UE based on the computed loss function. The tracking component 198 may be within the cellular baseband processor(s) 1524, the application processor(s) 1506, or both the cellular baseband processor(s) 1524 and the application processor(s) 1506. The tracking component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1504 may include a variety of components configured for various functions. In one configuration, the apparatus 1504, and in particular the cellular baseband processor(s) 1524 and/or the application processor(s) 1506, may include means for measuring a set of ToFs between the first UE and a second UE at multiple locations of the first UE. The apparatus 1504 may further include means for tracking positions and orientations of the first UE during the measurement of the set of ToFs at the multiple locations of the first UE. The apparatus 1504 may further include means for computing a loss function based on the set of ToFs and the tracked positions and orientations of the first UE, where the loss function is associated with a probability in which the second UE is at a specified location. The apparatus 1504 may further include means for estimating at least one of a direction or a distance of the second UE from the first UE based on the computed loss function.

In one configuration, the means for estimating at least one of the direction or the distance of the second UE from the first UE based on the computed loss function may include configuring the apparatus 1504 to calculate a minimum for the computed loss function using at least one minimization technique, and estimate at least one of the direction or the distance of the second UE from the first UE based on the calculated minimum for the computed loss function. In some implementations, the at least one minimization technique includes at least one of a gradient descent or an exhaustive search.

In another example, the means for computing the loss function based on the set of ToFs and the tracked positions and the orientations of the first UE may include configuring the apparatus 1504 to calculate one distance ($r_i$) between the first UE and the second UE at each location ($\vec{p}_N$) of the multiple locations of the first UE, and configure the loss function based on differences between the multiple calculated distances ($r_i$) between the first UE and the second UE at the multiple locations ($\vec{p}_N$). In some implementations, the calculated distance at each location of the multiple locations of the first UE is associated with a constant unknown offset ($\omega$). In some implementations, to configure the loss function may include configuring the apparatus 1504 to build the loss function based on a positive likelihood associated with the probability, where at least one of the estimated direction or the estimated distance is a position at which the positive likelihood is maximized. In some implementations, to configure the loss function may include configuring the apparatus 1504 to build the loss function based on a negative likelihood associated with the probability, where at least one of the estimated direction or the estimated distance is a position at which the negative likelihood is minimized.

In another example, the apparatus 1504 may further include means for assigning each ToF in the set of ToFs with a weight based on at least one of: a time at which each ToF is measured, a speed at which each ToF is measured, whether the second UE is moving while the ToF is measured, or a signal strength for each ToF is measured, where the computation of the loss function is further based on the assigned weight associated with each of the set of ToFs.

In another example, the means for measuring the set of ToFs between the first UE and the second UE at the multiple locations of the first UE may include configuring the apparatus 1504 to transmit a first signal to the second UE at each location of the multiple locations, receive a second signal from the second UE at each location of the multiple locations, and calculate a ToF for the first signal and the second signal for each location of the multiple locations to obtain the set of ToFs.

In another example, the apparatus 1504 may further include means for outputting an indication of a point at which the computed loss function is minimized. In some implementations, the means for outputting the indication of the point may include configuring the apparatus 1504 to transmit the indication of the point, store the indication of the point, or display the indication of the point.

In another example, the means for tracking the positions and the orientations of the first UE may include configuring the apparatus 1504 to track the positions and the orientations of the first UE using at least one IMU, at least one camera, or a combination thereof.

In another example, the apparatus 1504 further comprises at least one uncalibrated transceiver or radio, and wherein the at least one uncalibrated transceiver or radio includes at least one of: a Bluetooth® transceiver, a Wi-Fi® transceiver, or an UWB transceiver.

In another example, the multiple locations of the first UE include at least three different locations of the first UE.

In another example, at least one of the first UE or the second UE includes at least one of an uncalibrated antenna, an uncalibrated radio, or an RF chain with at least one uncalibrated element.

The means may be the tracking component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first user equipment (UE), comprising: measuring a set of time-of-flights (ToFs) between the first UE and a second UE at multiple locations of the first UE; tracking positions and orientations of the first UE during the measurement of the set of ToFs at the multiple locations of the first UE; computing a loss function based on the set of ToFs and the tracked positions and orientations of the first UE, wherein the loss function is associated with a probability in which the second UE is at a specified location; and estimating at least one of a direction or a distance of the second UE from the first UE based on the computed loss function.

Aspect 2 is the method of aspect 1, wherein estimating at least one of the direction or the distance of the second UE from the first UE based on the computed loss function comprises: calculating an extremum for the computed loss function using at least one optimization technique; and estimating at least one of the direction or the distance of the second UE from the first UE based on the calculated extremum for the computed loss function.

Aspect 3 is the method of aspect 1 or aspect 2, wherein the at least one optimization technique includes at least one of a gradient descent or an exhaustive search.

Aspect 4 is the method of any of aspects 1 to 3, wherein computing the loss function based on the set of ToFs and the tracked positions and the orientations of the first UE comprises: calculating one distance between the first UE and the second UE at each location of the multiple locations of the first UE; and configuring the loss function based on differences between the multiple calculated distances between the first UE and the second UE at the multiple locations.

Aspect 5 is the method of any of aspects 1 to 4, wherein the calculated distance at each location of the multiple locations of the first UE is associated with a constant unknown offset.

Aspect 6 is the method of any of aspects 1 to 5, wherein configuring the loss function comprises building the loss function based on a positive likelihood associated with the probability, wherein at least one of the estimated direction or the estimated distance is a position at which the positive likelihood is maximized.

Aspect 7 is the method of any of aspects 1 to 6, wherein configuring the loss function comprises building the loss function based on a negative likelihood associated with the probability, wherein at least one of the estimated direction or the estimated distance is a position at which the negative likelihood is minimized.

Aspect 8 is the method of any of aspects 1 to 7, further comprising: assigning each ToF in the set of ToFs with a weight based on at least one of: a time at which each ToF is measured, a speed at which each ToF is measured, whether the second UE is moving while the ToF is measured, or a signal strength for each ToF is measured, wherein the computation of the loss function is further based on the assigned weight associated with each of the set of ToFs.

Aspect 9 is the method of any of aspects 1 to 8, wherein measuring the set of ToFs between the first UE and the second UE at the multiple locations of the first UE comprises: transmitting a first signal to the second UE at each location of the multiple locations; receiving a second signal from the second UE at each location of the multiple locations; and calculating a ToF for the first signal and the second signal for each location of the multiple locations to obtain the set of ToFs.

Aspect 10 is the method of any of aspects 1 to 9, further comprising: outputting an indication of a point at which the computed loss function is minimized.

Aspect 11 is the method of any of aspects 1 to 10, wherein outputting the indication of the point comprises: transmitting the indication of the point; storing the indication of the point; or displaying the indication of the point.

Aspect 12 is the method of any of aspects 1 to 11, wherein tracking the positions and the orientations of the first UE comprises: tracking the positions and the orientations of the first UE using at least one inertial measurement unit (IMU), at least one camera, or a combination thereof.

Aspect 13 is the method of any of aspects 1 to 12, further comprising at least one uncalibrated transceiver or radio, and wherein the at least one uncalibrated transceiver or radio includes at least one of: a Bluetooth® transceiver, a Wi-Fi® transceiver, or an ultra-wideband (UWB) transceiver.

Aspect 14 is the method of any of aspects 1 to 13, wherein the multiple locations of the first UE include at least three different locations of the first UE.

Aspect 15 is the method of any of aspects 1 to 14, wherein at least one of the first UE or the second UE includes at least one of an uncalibrated antenna, an uncalibrated radio, or a radio frequency (RF) chain with at least one uncalibrated element.

Aspect 16 is an apparatus for wireless communication at a first user equipment (UE), including: at least one memory; and at least one processor coupled to the at least one memory and, based at least in part on stored information that is stored in the at least one memory, the at least one processor, individually or in any combination, is configured to implement any of aspects 1 to 15.

Aspect 17 is the apparatus of aspect 16, further including at least one transceiver coupled to the at least one processor.

Aspect 18 is an apparatus for wireless communication at a first user equipment (UE) including means for implementing any of aspects 1 to 15.

Aspect 19 is a computer-readable medium (e.g., a non-transitory computer-readable medium) storing computer executable code, where the code when executed by a processor causes the processor to implement any of aspects 1 to 15.

What is claimed is:

1. An apparatus for wireless communication at a first user equipment (UE), comprising:

at least one memory; and at least one processor coupled to the at least one memory, the at least one processor, individually or in any combination, is configured to:

measure a set of time-of-flights (ToFs) between the first UE and a second UE at multiple locations of the first UE;

track positions and orientations of the first UE during the measurement of the set of ToFs at the multiple locations of the first UE;

compute a loss function based on the set of ToFs and the tracked positions and orientations of the first UE, wherein the loss function is associated with a probability in which the second UE is at a specified location; and estimate at least one of a direction or a distance of the second UE from the first UE based on the computed loss function.

2. The apparatus of claim 1, wherein to estimate at least one of the direction or the distance of the second UE from the first UE based on the computed loss function, the at least one processor, individually or in any combination, is configured to:

calculate an extremum for the computed loss function using at least one optimization technique; and estimate at least one of the direction or the distance of the second UE from the first UE based on the calculated extremum for the computed loss function.

3. The apparatus of claim 2, wherein the at least one optimization technique includes at least one of a gradient descent or an exhaustive search.

4. The apparatus of claim 1, wherein to compute the loss function based on the set of ToFs and the tracked positions and the orientations of the first UE, the at least one processor, individually or in any combination, is configured to:

calculate one distance between the first UE and the second UE at each location of the multiple locations of the first UE; and configure the loss function based on differences between the multiple calculated distances between the first UE and the second UE at the multiple locations.

5. The apparatus of claim 4, wherein the calculated distance at each location of the multiple locations of the first UE is associated with a constant unknown offset.

6. The apparatus of claim 4, wherein to configure the loss function, the at least one processor, individually or in any combination, is configured to:

build the loss function based on a positive likelihood associated with the probability, wherein at least one of the estimated direction or the estimated distance is a position at which the positive likelihood is maximized.

7. The apparatus of claim 4, wherein to configure the loss function, the at least one processor, individually or in any combination, is configured to:

build the loss function based on a negative likelihood associated with the probability, wherein at least one of the estimated direction or the estimated distance is a position at which the negative likelihood is minimized.

8. The apparatus of claim 1, wherein the at least one processor, individually or in any combination, is further configured to:

assign each ToF in the set of ToFs with a weight based on at least one of:

a time at which each ToF is measured, a speed at which each ToF is measured, whether the second UE is moving while the ToF is measured, or a signal strength for each ToF is measured, wherein the computation of the loss function is further based on the assigned weight associated with each of the set of ToFs.

9. The apparatus of claim 1, wherein to measure the set of ToFs between the first UE and the second UE at the multiple locations of the first UE, the at least one processor, individually or in any combination, is configured to:

transmit a first signal to the second UE at each location of the multiple locations;

receive a second signal from the second UE at each location of the multiple locations; and calculate a ToF for the first signal and the second signal for each location of the multiple locations to obtain the set of ToFs.

10. The apparatus of claim 1, wherein the at least one processor, individually or in any combination, is further configured to:

output an indication of a point at which the computed loss function is minimized.

11. The apparatus of claim 10, wherein to output the indication of the point, the at least one processor, individually or in any combination, is configured to:

transmit the indication of the point;

store the indication of the point; or display the indication of the point.

12. The apparatus of claim 1, wherein to track the positions and the orientations of the first UE, the at least one processor, individually or in any combination, is configured to:

track the positions and the orientations of the first UE using at least one inertial measurement unit (IMU), at least one camera, or a combination thereof.

13. The apparatus of claim 1, further comprising at least one uncalibrated transceiver or radio, and wherein the at least one uncalibrated transceiver or radio includes at least one of:

a Bluetooth® transceiver, a Wi-Fi® transceiver, or an ultra-wideband (UWB) transceiver.

14. The apparatus of claim 1, wherein the multiple locations of the first UE include at least three different locations of the first UE.

15. The apparatus of claim 1, wherein at least one of the first UE or the second UE includes at least one of an uncalibrated antenna, an uncalibrated radio, or a radio frequency (RF) chain with at least one uncalibrated element.

16. The apparatus of claim 1, further comprising a user interface (UI), wherein the at least one processor, individually or in any combination, is further configured to:

provide, at the UI, a guidance for moving the first UE, wherein the UI includes a graphical user interface (GUI) configured to display a first graphical icon that is configured to move or change size as the first UE is moved.

17. A method of wireless communication at a first user equipment (UE), comprising:

measuring a set of time-of-flights (ToFs) between the first UE and a second UE at multiple locations of the first UE;

tracking positions and orientations of the first UE during the measurement of the set of ToFs at the multiple locations of the first UE;

computing a loss function based on the set of ToFs and the tracked positions and orientations of the first UE, wherein the loss function is associated with a probability in which the second UE is at a specified location; and estimating at least one of a direction or a distance of the second UE from the first UE based on the computed loss function.

18. The method of claim 17, wherein estimating at least one of the direction or the distance of the second UE from the first UE based on the computed loss function comprises:

calculating an extremum for the computed loss function using at least one optimization technique; and estimating at least one of the direction or the distance of the second UE from the first UE based on the calculated extremum for the computed loss function.

19. The method of claim 17, wherein computing the loss function based on the set of ToFs and the tracked positions and the orientations of the first UE comprises:

calculating one distance between the first UE and the second UE at each location of the multiple locations of the first UE; and configuring the loss function based on differences between the multiple calculated distances between the first UE and the second UE at the multiple locations.

20. An apparatus for wireless communication at a first user equipment (UE), comprising:

a user interface (UI);

at least one memory; and at least one processor coupled to the at least one memory, the at least one processor, individually or in any combination, is configured to:

provide, at the UI, a guidance for moving the first UE, wherein the UI includes a graphical user interface (GUI) configured to display a first graphical icon that is configured to move or change size as the first UE is moved;

measure a set of time-of-flights (ToFs) between the first UE and a second UE at multiple locations of the first UE;

track positions and orientations of the first UE during the measurement of the set of ToFs at the multiple locations of the first UE;

compute a loss function based on the set of ToFs and the tracked positions and orientations of the first UE, wherein the loss function is associated with a probability in which the second UE is at a specified location; and estimate at least one of a direction or a distance of the second UE from the first UE based on the computed loss function.

* * * * *